(12) United States Patent
Shin et al.

(10) Patent No.: US 11,733,804 B2
(45) Date of Patent: Aug. 22, 2023

(54) TOUCH DISPLAY DEVICE

(71) Applicant: LG Display Co., Ltd., Seoul (KR)

(72) Inventors: SeungRok Shin, Paju-si (KR); Sangkyu Kim, Paju-si (KR); DeukSu Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/840,041

(22) Filed: Jun. 14, 2022

(65) Prior Publication Data
US 2023/0004253 A1 Jan. 5, 2023

(30) Foreign Application Priority Data

Jul. 5, 2021 (KR) .......................... 10-2021-0087654

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0446* (2019.05); *G06F 3/04166* (2019.05); *G06F 2203/04107* (2013.01)

(58) Field of Classification Search
CPC .. G06F 3/0418; G06F 3/0412; G06F 3/04166; G06F 3/0446; G06F 2203/04107
See application file for complete search history.

(56) References Cited

U.S. PATENT DOCUMENTS

| | | | | |
|---|---|---|---|---|
| 2012/0050217 | A1* | 3/2012 | Noguchi | G06F 3/04166 345/173 |
| 2012/0249454 | A1* | 10/2012 | Teraguchi | G06F 3/0445 345/173 |
| 2015/0378512 | A1* | 12/2015 | Choi | G06F 3/044 345/174 |
| 2017/0212634 | A1* | 7/2017 | Huang | G06F 3/0445 |
| 2017/0277329 | A1* | 9/2017 | Ding | G06F 3/0446 |
| 2019/0302959 | A1* | 10/2019 | Clark | G06F 3/044 |
| 2020/0004368 | A1* | 1/2020 | Kim | G06F 3/0443 |
| 2020/0027929 | A1* | 1/2020 | Lee | G06F 3/0446 |
| 2020/0363907 | A1* | 11/2020 | Heo | G06F 3/04166 |
| 2021/0343972 | A1* | 11/2021 | Zheng | H01L 27/3246 |

* cited by examiner

*Primary Examiner* — Hong Zhou
(74) *Attorney, Agent, or Firm* — Fenwick & West LLP

(57) ABSTRACT

The disclosure is related to a touch display device, a shield electrode separated from a common electrode of a light-emitting element can be disposed on an area overlapping a touch electrode under an encapsulation layer, and a shield driving signal corresponding to a signal supplied to the touch electrode can be supplied to the shield electrode. Thus, the shield electrode prevents or at least reduces formation of a parasitic capacitance between an electrode or a signal line for a display driving and the touch electrode, and a touch detection performance can be improved by implementing a noise blocking function by the shield electrode.

14 Claims, 20 Drawing Sheets

TOUCH DISPLAY DEVICE

CROSS REFERENCE TO RELATED APPLICATION

This application claims priority from Republic of Korea Patent Application No. 10-2021-0087654, filed on Jul. 5, 2021, which is hereby incorporated by reference in its entirety.

BACKGROUND

Field

Embodiments of the present disclosure are related to a touch display device.

Description of Related Art

The growth of the information society leads to increased demand for display devices to display images and use of various types of display devices, such as liquid crystal display devices, organic light emitting display devices, etc.

The display devices, for providing more various functions, can detect a touch by a finger or a pen of a user contacted to a display panel, and can perform an input process based on the detected touch.

The display devices, for example, can include a plurality of touch electrodes disposed on the display panel, or imbedded in the display panel. The display devices can drive the touch electrode, and can sense the touch of the user to the display panel by detecting a change of a capacitance generated by the touch of the user.

An electrode or a signal line for display driving other than the touch electrode can be included in the display panel. As a parasitic capacitance between an electrode for the display driving and the touch electrode can be formed, there is a problem that a touch detection performance can be reduced.

SUMMARY

Embodiments of the present disclosure can provide a touch display device capable of reducing occurrence of a noise in a signal detected from a touch electrode by an electrode or a signal line for a display driving.

Embodiments of the present disclosure can provide a touch display device being capable of reducing a reduction of a display driving performance while reducing a noise of a signal detected from a touch electrode.

Embodiments of the present disclosure can provide a touch display device including a substrate including an active area where a plurality of subpixels are disposed and a non-active area positioned outside of the active area, an encapsulation layer disposed on at least a part area of the active area and the non-active area, and a plurality of touch electrodes positioned on the encapsulation layer.

A plurality of common electrodes can be positioned under the encapsulation layer. The plurality of common electrodes can be disposed on an area including a light-emitting area included in each of the plurality of subpixels.

A plurality of shield electrodes can be positioned under the encapsulation layer. The plurality of shield electrodes can be disposed to be separated from the plurality of common electrodes. The plurality of shield electrodes can be disposed on at least a part area of an area overlapping the plurality of touch electrodes.

Embodiments of the present disclosure can provide a touch display device including a plurality of touch electrodes including a plurality of open areas, a plurality of first common electrodes disposed on an area corresponding to the plurality of open areas and being supplied a common voltage in a display driving period, and a plurality of second common electrodes disposed to be separated from the plurality of first common electrodes, disposed on at least a part area of an area overlapping the plurality of touch electrodes, and being supplied a signal different from the common voltage in at least a part period of the display driving period.

According to various embodiments of the present disclosure, since a shield electrode disposed to be separated from a common electrode of a light-emitting element is disposed on an area overlapping a touch electrode under an encapsulation layer, thus a touch display device being capable of reducing a reduction of touch detection performance due to a parasitic capacitance between the common electrode and the touch electrode can be provided.

According to various embodiments of the present disclosure, as a signal corresponding to a signal supplied to a touch electrode is supplied to a shield electrode, thus a touch display device that a noise blocking performance by the shield electrode is improved can be provided.

According to various embodiments of the present disclosure, by adjusting a period in which a signal is supplied to a shield electrode or a frequency of the signal supplied to the shield electrode, a touch display device being capable of improving a touch detection performance while preventing that the signal supplied to the shield electrode affects a display driving can be provided.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
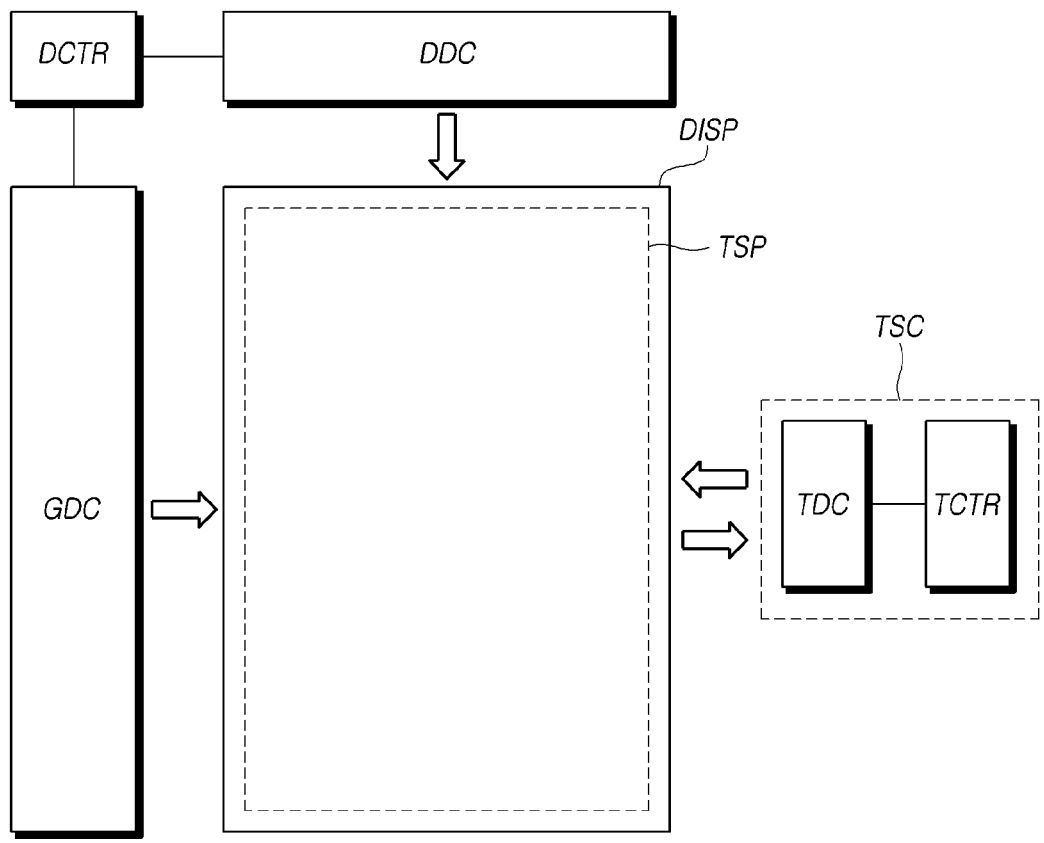
FIG. 1 is a system configuration diagram of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a system configuration diagram of a touch display device according to embodiments of the present disclosure.

Referring to FIG. 1, the touch display device according to embodiments of the present disclosure can provide both an image display function and a touch-sensing function.

To provide the image display function, the touch display device according to embodiments of the present disclosure can comprise: a display panel DISP in which a plurality of data lines and a plurality of gate lines are disposed and a plurality of subpixels defined by the plurality of data lines and the plurality of gate lines are arrayed; a data driver (or data driver circuit) DDC driving the plurality of data lines; a gate driver (or gate driver circuit) GDC driving the plurality of gate lines; a display controller DCTR controlling the data driver DDC and gate driver GDC, and the like.

Each of the data driver DDC, the gate driver GDC, and the display controller DCTR can be implemented as one or more separate components. In some cases, two or more of the data driver DDC, the gate driver GDC, and the display controller DCTR can be integrated into a single component. For example, the data driver DDC and the display controller DCTR can be implemented as a single integrated circuit (IC) chip.

To provide the touch-sensing function, the touch display device according to embodiments of the present disclosure can comprise: a touch panel TSP including a plurality of touch electrodes; and a touch-sensing circuit TSC supplying a touch driving signal to the touch panel TSP, detecting a touch-sensing signal from the touch panel TSP, and detecting a touch of a user or determining a touch position (touch coordinates) on the touch panel TSP on the basis of a detected touch-sensing signal.

For example, the touch-sensing circuit TSC can comprise a touch driving circuit TDC supplying a touch driving signal to the touch panel TSP and detecting a touch-sensing signal from the touch panel TSP and a touch controller TCTR determining at least one of the touch of the user and the touch coordinates on the basis of the touch-sensing signal detected by the touch driving circuit TDC, and the like.

The touch driving circuit TDC can comprise a first circuit part supplying the touch driving signal to the touch panel TSP and a second circuit part detecting the touch-sensing signal from the touch panel TSP.

The touch driving circuit TDC and the touch controller TCTR can be provided as separate components or, in some cases, can be integrated into a single component.

In addition, each of the data driver DDC, the gate driver GDC, and the touch driving circuit TDC is implemented as one or more ICs, and in terms of electrical connection to the display panel DISP, can have a chip-on-glass (COG) structure, a chip-on-film (COF) structure, a tape carrier package (TCP) structure, or the like. In addition, the gate driver GDC can have a gate-in-panel (GIP) structure.

In addition, each of the circuit configurations DDC, GDC, and DCTR for display driving and the circuit configurations TDC and TCTR for touch sensing can be implemented as one or more separate components. In some cases, one or more of the display driving circuit configurations DDC, GDC, and DCTR and one or more of the touch-sensing circuit configurations TDC and TCTR can be functionally integrated into one or more components.

For example, the data driver DDC and the touch driving circuit TDC can be integrated into one or more IC chips. In a case in which the data driver DDC and the touch driving circuit TDC are integrated into two or more IC chips, each of the two or more IC chips can have both a data driving function and a touch driving function.

In addition, the touch display device according to embodiments of the present disclosure can be various types of devices, such as an organic light-emitting diode (OLED) display device and a liquid crystal display (LCD) device. Hereinafter, the touch display device will be described as an OLED display device for the sake of brevity. That is, although the display panel DISP can be various types of devices, such as an OLED and an LCD, the display panel DISP will be described as an OLED panel as an example for the sake of brevity.

In addition, as will be described later, the touch panel TSP can comprise a plurality of touch electrodes to which the touch driving signal is applicable or from which the touch-sensing signal is detectable; a plurality of touch routing lines connecting the plurality of touch electrodes to the touch driving circuit TDC; and the like.

The touch panel TSP can be located outside of the display panel DISP. That is, the touch panel TSP and the display panel DISP can be fabricated separately and combined thereafter. Such a touch panel TSP is referred to as an add-on touch panel.

Alternatively, the touch panel TSP can be disposed inside of the display panel DISP. That is, when the display panel DISP is fabricated, touch sensor structures of the touch panel TSP, including the plurality of touch electrodes, the plurality of touch routing lines, and the like, can be provided together with electrodes and signal lines used for the display driving. Such a touch panel TSP is referred to as an in-cell touch panel. Hereinafter, for the sake of brevity, the touch panel TSP will be described as an in-cell touch panel TSP as an example.

Figure 2:
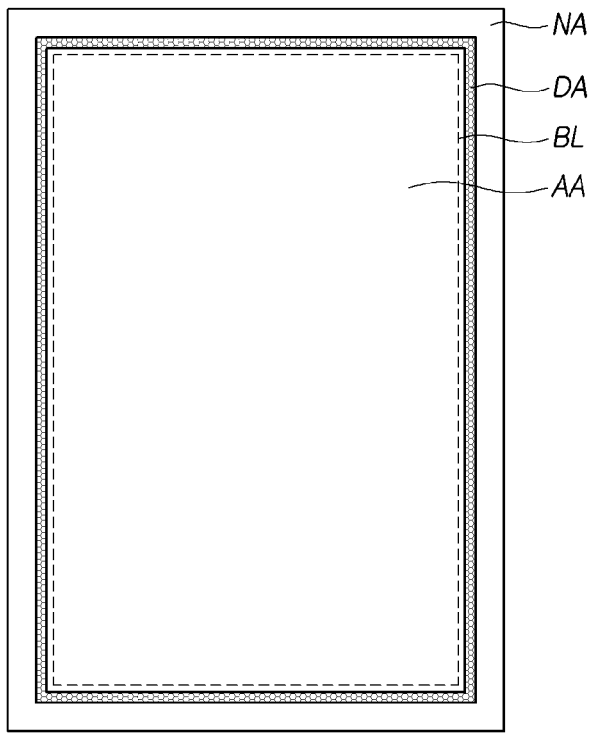
FIG. 2 is a diagram schematically illustrating a display panel of a touch display device according to embodiments of the present disclosure.

FIG. 2 is a diagram schematically illustrating the display panel DISP of a touch display device according to embodiments of the present disclosure.

Referring to FIG. 2, the display panel DISP can comprise an active area AA on which images are displayed and a non-active area NA located outside of an outer boundary line BL of the active area AA.

In the active area AA of the display panel DISP, a plurality of subpixels for displaying images are arrayed, and a variety of electrodes and signal lines for the display driving are disposed.

In addition, the plurality of touch electrodes for the touch sensing, the plurality of touch routing lines electrically connected to the plurality of touch electrodes, and the like can be disposed in the active area AA of the display panel DISP. Accordingly, the active area AA can also be referred to as a touch-sensing area in which the touch sensing can be performed.

In the non-active area NA of the display panel DISP, link lines produced by extending a variety of signal lines disposed in the active area AA or link lines electrically connected to the variety of signal lines disposed in the active area AA and pads electrically connected to the link lines can be disposed. The pads disposed in the non-active area NA can be bonded or electrically connected to the display driving circuits, such as DDC and GDC.

In addition, in the non-active area NA of the display panel DISP, link lines produced by extending a plurality of touch routing lines disposed in the active area AA or link lines electrically connected to the plurality of touch routing lines disposed in the active area AA and pads electrically connected to the link lines can be disposed. The pads disposed in the non-active area NA can be bonded or electrically connected to the touch driving circuit TDC.

In the non-active area NA, portions produced by expanding portions of the outermost touch electrodes among the plurality of touch electrodes disposed in the active area AA can be provided, and one or more electrodes (e.g., touch electrodes) made of the same material as the plurality of touch electrodes disposed in the active area AA can be further disposed.

That is, the entirety of the plurality of touch electrodes disposed in the display panel DISP can be located in the active area AA, specific touch electrodes (e.g., the outermost touch electrodes) among the plurality of touch electrodes disposed in the display panel DISP can be located in the non-active area NA, or specific touch electrodes (e.g., the outermost touch electrodes) among the plurality of touch electrodes disposed in the display panel DISP can extend across at least a portion of the active area AA and at least a portion of the non-active area NA.

In addition, referring to FIG. 2, the display panel DISP of the touch display device according to embodiments of the present disclosure can comprise a dam area DA in which a dam DAM (see FIG. 9) is disposed, the dam DAM serving to prevent or at least reduce a layer (e.g., an encapsulation layer in the OLED display panel) in the active area AA from collapsing.

The dam area DA can be located at the boundary between the active area AA and the non-active area NA, in a location of the non-active area NA at the periphery of the active area AA, or the like.

The dam disposed in the dam area DA can be disposed to surround the active area AA in all directions or only at the periphery of one or more portions (i.e., portions in which a fragile layer is located) of the active area AA.

The dams disposed in the dam area DA can be connected to be made as a single pattern or to be made as two or more separate patterns. In addition, in the dam area DA, a first dam can be disposed, or two dams (i.e., a first dam and a second dam) can be disposed, or three or more dams can be disposed.

In the dam area DA, the first dam can be provided in one direction, and both the first dam and the second dam can be provided in the other direction.

Figure 3:
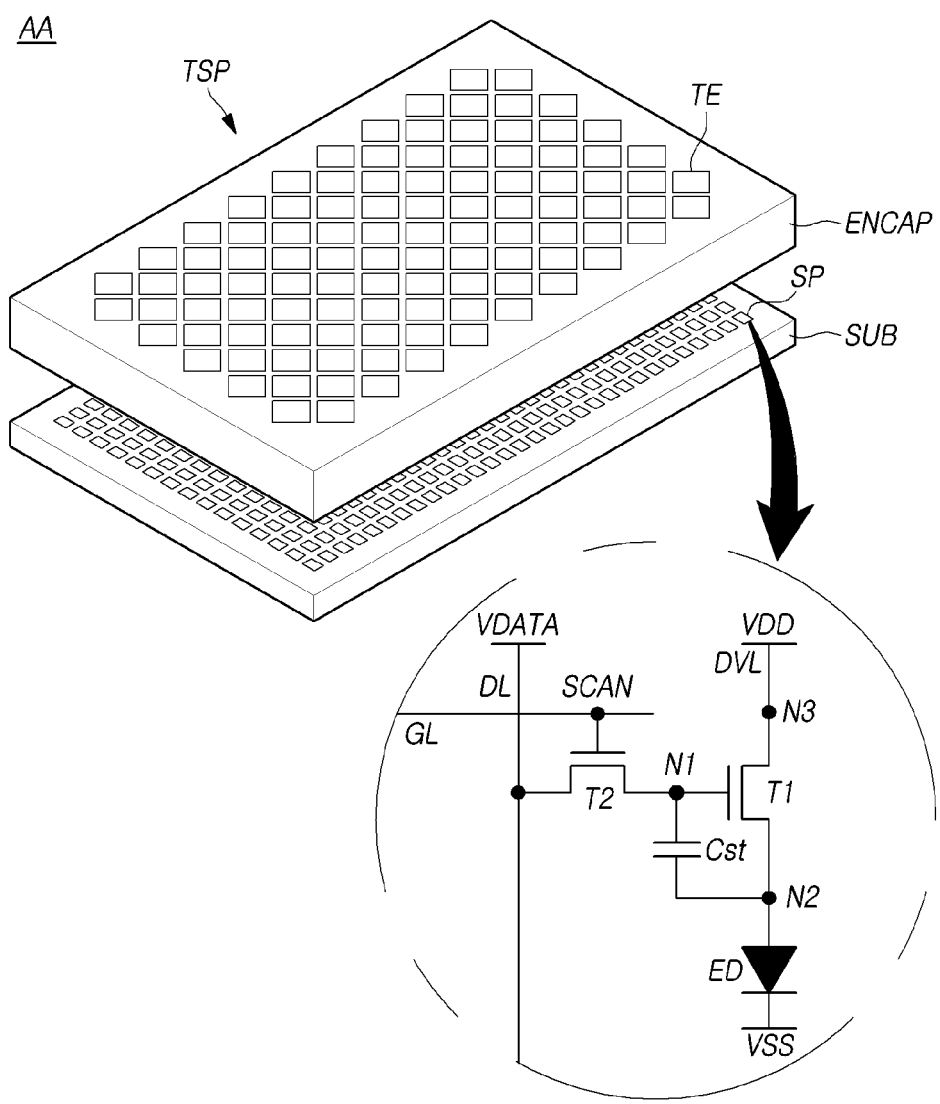
FIG. 3 is a diagram exemplary illustrating a structure where a touch panel is embedded in a display panel according to embodiments of the present disclosure.

FIG. 3 is a diagram exemplary illustrating a structure that the touch panel TSP is embedded in the display panel DISP according to embodiments of the present disclosure.

Referring to FIG. 3, a plurality of subpixels SP are arrayed on a substrate SUB in the active area AA of the display panel DISP.

Each of the subpixels SP can comprise an emitting device ED, a first transistor T1 driving the emitting device ED, a second transistor T2 delivering a data voltage VDATA to a first node N1 of the first transistor T1, a storage capacitor Cst maintaining a predetermined voltage for a single frame, and the like.

The first transistor T1 can comprise the first node N1 to which the data voltage VDATA is applicable, a second node N2 electrically connected to the emitting device ED, and a third node N3 to which a driving voltage is applied from a driving voltage line DVL. The first node N1 can be a gate node, the second node N2 can be a source node or a drain node, and the third node N3 can be a drain node or a source node. Such a first transistor T1 is also referred to as a driving transistor driving the emitting device ED.

The emitting device ED can comprise a first electrode (e.g., an anode), an emissive layer, and a second electrode (e.g., a cathode). The first electrode can be electrically connected to the second node N2 of the first transistor T1, and the second electrode can have a base voltage VSS applied thereto. The second electrodes of each of two or more light-emitting element ED can be electrically connected to each other. In the present disclosure, the second electrode can be referred to "a common electrode".

The emissive layer of the emitting device ED can be an organic emissive layer containing an organic material. In this case, the emitting device ED can be an organic light-emitting diode (OLED).

The second transistor T2 can be controlled to be either on or off by a scan signal SCAN applied through a gate line GL and be electrically connected to the first node N1 of the first transistor T1 and a data line DL. Such a second transistor T2 is also referred to as a switching transistor.

When the second transistor T2 is turned on by the scan signal SCAN, the second transistor T2 delivers the data voltage VDATA supplied through the data line DL to the first node N1 of the first transistor T1.

The storage capacitor Cst can be electrically connected to the first node N1 and the second node N2 of the first transistor T1.

As illustrated in FIG. 3, each of the subpixels SP can have a 2T1C comprised of two transistors T1 and T2 and a single capacitor Cst. In some cases, each of the subpixels SP can further comprise one or more transistors or one or more capacitors.

The storage capacitor Cst can be an external capacitor intentionally designed to be disposed externally of the first transistor T1, rather than a parasitic capacitor (e.g., Cgs or Cgd), i.e., an internal capacitor present between the first node N1 and the second node N2 of the first transistor T1.

Each of the first transistor T1 and the second transistor T2 can be an n-type transistor or a p-type transistor.

As described above, circuit components, including the emitting device ED, two or more transistors T1 and T2, and one or more capacitor Cst, are disposed in the display panel DISP. Since such circuit components (in particular, the emitting device ED) are vulnerable to external moisture, oxygen, or the like, an encapsulation layer ENCAP preventing or at least reducing external moisture or oxygen from penetrating the circuit elements (in particular, the emitting device ED) can be disposed in the display panel DISP.

Such an encapsulation layer ENCAP can be a single layer or have a multilayer structure.

In addition, in the touch display device according to embodiments of the present disclosure, the touch panel TSP can be disposed on the encapsulation layer ENCAP.

That is, in the touch display device, a touch sensor structure, including the plurality of touch electrodes TE, of the touch panel TSP can be disposed on the encapsulation layer ENCAP.

In the touch sensing, the touch driving signal or the touch-sensing signal can be applied to the touch electrodes TE. Then, in the touch sensing, a potential difference can be produced between a touch electrode TE and a cathode disposed on both sides of the encapsulation layer ENCAP, thereby generating unnecessary parasitic capacitance. Since such parasitic capacitance can reduce touch sensitivity, the distance between the touch electrode TE and the cathode can be designed to be a predetermined value (e.g., 1 μm) or more in consideration of the thickness of the panel, a panel fabrication process, display performance, and the like in order to reduce the parasitic capacitance. In this regard, for example, the thickness of the encapsulation layer ENCAP can be designed to be 1 μm or more.

The touch display device according to embodiments of the present disclosure can detect a touch on the basis of capacitance generated on the touch electrode TE.

The touch display device according to embodiments of the present disclosure can detect a touch by a capacitance-based touch sensing method, more particularly, mutual capacitance-based touch sensing or self-capacitance-based touch sensing.

In the mutual capacitance-based touch sensing, the plurality of touch electrodes TE can be divided into driving touch electrodes (or transmitting touch electrodes) to which the touch driving signal is applied and sensing touch electrodes (or receiving touch electrodes) detecting the touch sensing signal and generating capacitance together with the driving touch electrodes.

In the mutual capacitance-based touch sensing, the touch-sensing circuit TSC detects a touch and determines touch coordinates on the basis of changes in the capacitance (i.e., mutual capacitance) occurring between the driving touch electrodes and the sensing touch electrodes, depending on the presence or absence of a pointer, such as a finger or a pen.

In the self-capacitance-based touch sensing, each of the touch electrodes TE serves as both a driving touch electrode and a sensing touch electrode. That is, the touch-sensing circuit TSC detects a touch and determines touch coordinates by applying the touch driving signal to one or more touch electrodes TE, detecting the touch-sensing signal through the touch electrode TE to which the touch driving signal is applied, and recognizing changes in the capacitance between the pointer, such as a finger or a pen, and the touch electrode TE, on the basis of the detected touch-sensing signal. Accordingly, in the self-capacitance-based touch sensing, there is no difference between the driving touch electrodes and the sensing touch electrodes.

As described above, the touch display device according to embodiments of the present disclosure can perform the touch sensing by the mutual capacitance-based touch sensing or the self-capacitance-based touch sensing. Hereinafter, for the sake of brevity, the touch display device performing the mutual capacitance-based touch sensing and having a touch sensor structure for the mutual capacitance-based touch sensing will be described as an example.

Figure 4:
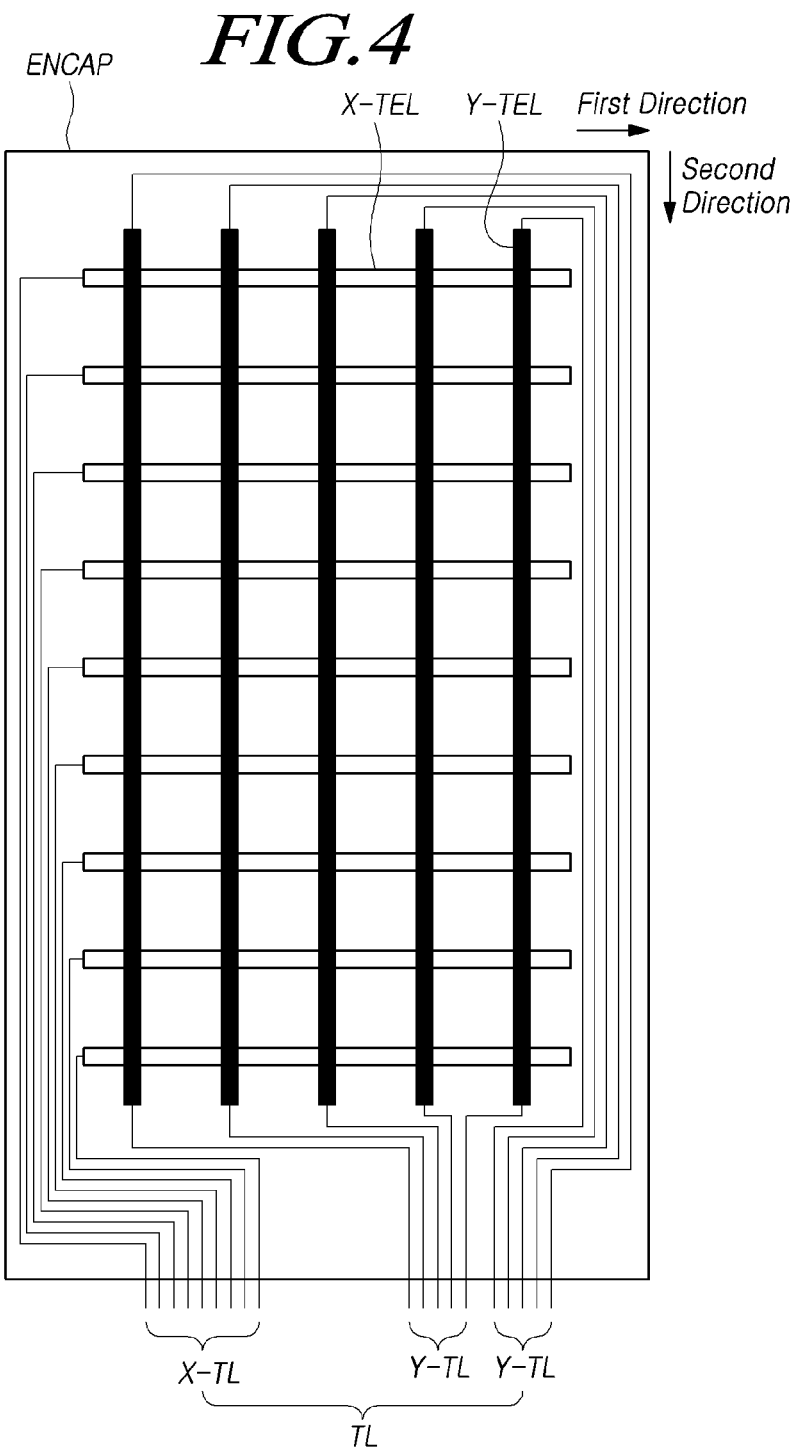
FIG. 4 is a diagram briefly illustrating a touch sensor structure in a display panel according to embodiments of the present disclosure.
Figure 5:
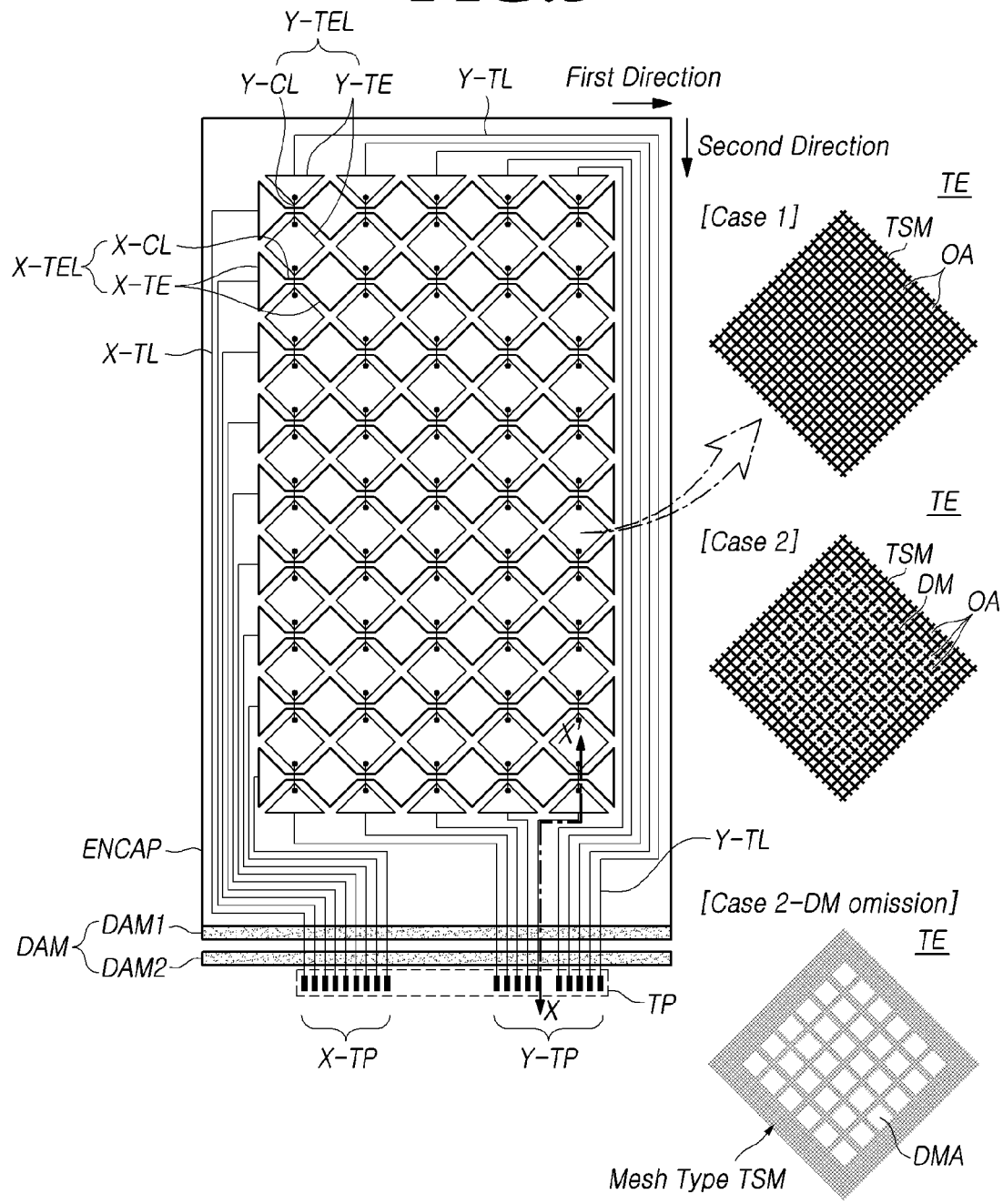
FIG. 5 is a diagram of an implementation example of the touch sensor structure of FIG. 4 according to embodiments of the present disclosure.

FIG. 4 is a diagram briefly illustrating a touch sensor structure in the display panel DISP according to embodiments of the present disclosure, FIG. 5 is a diagram of an implementation example of the touch sensor structure of FIG. 4 according to embodiments of the present disclosure.

Referring to FIG. 4, the touch sensor structure for the mutual capacitance-based touch sensing can comprise a plurality of X-touch electrode lines X-TEL and a plurality of Y-touch electrode lines Y-TEL. Here, the plurality of X-touch electrode lines X-TEL and the plurality of Y-touch electrode lines Y-TEL are located on the encapsulation layer ENCAP.

Each of the plurality of X-touch electrode lines X-TEL can be disposed in a first direction, and the plurality of Y-touch electrode lines Y-TEL can be disposed in a second direction different from the first direction.

Herein, the first direction and the second direction can be different directions. For example, the first direction can be the X-axis direction, while the second direction can be the Y-axis direction. Alternatively, the first direction can be the Y-axis direction, while the second direction can be the X-axis direction. In addition, the first direction and the second direction can or cannot intersect perpendicularly. In addition, the terms "column" and "row" as used herein are relative terms. The column and the row can be switched depending on the viewing perspective.

Each of the plurality of X-touch electrode lines X-TEL can be comprised of a plurality of X-touch electrodes X-TE electrically connected to each other. Each of the plurality of Y-touch electrode lines Y-TEL can be comprised of a plurality of Y-touch electrodes Y-TE electrically connected to each other.

Here, the plurality of X-touch electrodes X-TE and the plurality of Y-touch electrodes Y-TE are electrodes included in the plurality of touch electrodes TE, and have different functions.

For example, the plurality of X-touch electrodes X-TE constituting each of the plurality of X-touch electrode lines X-TEL can be the driving touch electrodes, while the plurality of Y-touch electrodes Y-TE constituting each of the plurality of Y-touch electrode lines Y-TEL can be the sensing touch electrodes. In this case, each of the plurality of X-touch electrode lines X-TEL corresponds to a driving touch electrode lines, and each of the plurality of Y-touch electrode lines Y-TEL corresponds to a sensing touch electrode line.

Alternatively, the plurality of X-touch electrodes X-TE constituting each of the plurality of X-touch electrode lines X-TEL can be the sensing touch electrodes, while the plurality of Y-touch electrodes Y-TE constituting each of the plurality of Y-touch electrode lines Y-TEL can be the driving touch electrodes. In this case, each of the plurality of X-touch electrode lines X-TEL corresponds to the sensing touch electrode line, and each of the plurality of Y-touch electrode lines Y-TEL corresponds to the driving touch electrode line.

A touch sensor metal TSM for the touch sensing can comprise a plurality of touch routing lines TL in addition to the plurality of X-touch electrode lines X-TEL and the plurality of Y-touch electrode lines Y-TEL.

The plurality of touch routing lines TL can comprise one or more X-touch routing lines X-TL connected to the plurality of X-touch electrode lines X-TEL, respectively, and one or more Y-touch routing lines Y-TL connected to the plurality of Y-touch electrode lines Y-TEL, respectively.

Referring to FIG. 5, each of the plurality of X-touch electrode lines X-TEL can comprise a plurality of X-touch electrodes X-TE disposed in the same row (or column) and one or more X-touch electrode connecting lines X-CL electrically connecting the plurality of X-touch electrodes X-TE. Here, the X-touch electrode connecting lines X-CL respectively connecting two adjacent X-touch electrodes X-TE can be metals integrated with the two adjacent X-touch electrodes X-TE (see FIG. 5) or metals connected to the two adjacent X-touch electrodes X-TE via contact holes.

Each of the plurality of Y-touch electrode lines Y-TEL can comprise a plurality of Y-touch electrodes Y-TE disposed in the same column (or row) and one or more Y-touch electrode connecting lines Y-CL electrically connecting the plurality of Y-touch electrodes Y-TE. Here, the Y-touch electrode connecting lines Y-CL respectively connecting two adjacent Y-touch electrodes Y-TE can be metals integrated with the two adjacent Y-touch electrodes Y-TE or metals connected to the two adjacent Y-touch electrodes Y-TE via contact holes (see FIG. 5).

In areas in which the X-touch electrode lines X-TEL intersect the Y-touch electrode lines Y-TEL (i.e., touch electrode line intersecting areas), the X-touch electrode connecting lines X-CL can intersect the Y-touch electrode connecting lines Y-CL.

In a case in which the X-touch electrode connecting lines X-CL intersect the Y-touch electrode connecting lines Y-CL in the touch electrode line intersecting areas as described above, the X-touch electrode connecting lines X-CL must be located on a layer different from that of the Y-touch electrode connecting lines Y-CL.

Accordingly, the plurality of X-touch electrodes X-TE, the plurality of X-touch electrode connecting lines X-CL, the plurality of Y-touch electrodes Y-TE, the plurality of Y-touch electrode lines Y-TEL, and the plurality of Y-touch electrode connecting lines Y-CL can be located on two or more layers, such that the plurality of X-touch electrode lines X-TEL intersect the plurality of Y-touch electrode lines Y-TEL.

Referring to FIG. 5, each of the plurality of X-touch electrode lines X-TEL is electrically connected to a corresponding X-touch pad X-TP through one or more X-touch routing lines X-TL. That is, the outermost X-touch electrode X-TE among the plurality of X-touch electrodes X-TE included in a single X-touch electrode line X-TEL is electrically connected to a corresponding X-touch pad X-TP via the X-touch routing line X-TL.

Each of the plurality of Y-touch electrode lines Y-TEL is electrically connected to corresponding Y-touch pads Y-TP through one or more Y-touch routing lines Y-TL. That is, the outermost Y-touch electrodes Y-TE among the plurality of Y-touch electrodes Y-TE included in a single Y-touch electrode line Y-TEL is electrically connected to the corresponding Y-touch pads Y-TP through the Y-touch routing lines Y-TL.

In addition, as illustrated in FIG. 5, the plurality of X-touch electrode lines X-TEL and the plurality of Y-touch electrode lines Y-TEL can be disposed on the encapsulation layer ENCAP. That is, the plurality of X-touch electrodes X-TE, constituting the plurality of X-touch electrode lines X-TEL, and the plurality of X-touch electrode connecting lines X-CL can be disposed on the encapsulation layer ENCAP. The plurality of Y-touch electrodes Y-TE, constituting the plurality of Y-touch electrode lines Y-TEL, and the plurality of Y-touch electrode connecting lines Y-CL can be disposed on the encapsulation layer ENCAP.

In addition, as illustrated in FIG. 5, the plurality of X-touch routing lines X-TL electrically connected to the plurality of X-touch electrode lines X-TEL can be disposed on the encapsulation layer ENCAP and extend to a location in which the encapsulation layer ENCAP is not provided, thereby being electrically connected to a plurality of X-touch pads X-TP, respectively. The plurality of Y-touch routing lines Y-TL electrically connected to the plurality of Y-touch electrode lines Y-TEL can be disposed on the encapsulation layer ENCAP and extend to a location in which encapsulation layer ENCAP is not provided, thereby being electrically connected to a plurality of Y-touch pads Y-TP, respectively. Here, the encapsulation layer ENCAP can be located in the active area AA and, in some cases, can expand to the non-active area NA.

In addition, as described above, a dam area DA can be provided at the boundary between the active area AA and the non-active area NA or in the non-active area NA at the periphery of the active area AA in order to prevent or at least reduce a layer (e.g., an encapsulation in the OLED display panel) in the active area AA from collapsing.

As illustrated in FIG. 5, for example, a first dam DAM1 and a second dam DAM2 can be disposed in the dam area DA. Here, the second dam DAM2 can be located more outward than the first dam DAM1.

In a manner different from that illustrated in FIG. 5, only the first dam DAM1 can be located in the dam area DA. In some cases, not only the first dam DAM1 and the second dam DAM2 but also one or more additional dam can be disposed in the dam area DA.

Referring to FIG. 5, the encapsulation layer ENCAP can be located on a side of the first dam DAM1 or be located both on a side of and above the first dam DAM1.

In the display panel DISP, the touch electrode TE can be a plate-shaped touch sensor metal TSM without an open area. In this case, each of the touch electrodes TE can be a transparent electrode. Each of the touch electrodes TE can be made of a transparent electrode material such that light emitted by the plurality of subpixels SP disposed below the encapsulation layer ENCAP can pass through the touch electrodes TE.

Alternatively, in the display panel DISP, the touch electrode TE can be a mesh type (Case 1). The touch electrode TE can be constituted by a touch sensor metal which is patterned as a mesh type and in which a plurality of open areas OA are formed. The touch sensor metal TSM of each touch electrode TE is a portion corresponding to the substantive touch electrode TE, can be a portion that a touch driving signal is applied or a touch sensing signal is detected. The touch sensor metal TSM corresponding to each touch electrode TE can be positioned on a bank disposed on an area other than the light-emitting area of the subpixel SP.

In the case that the touch electrode TE is the touch sensor metal TSM patterned as a mesh type, a plurality of open areas OA can be present on an area where the touch electrode TE is formed. Each of the plurality of open areas OA being present in each touch electrode TE can be corresponded to the light-emitting area of one or more subpixel SP or one or more transmissive area.

An outline of the touch electrode TE can be a square shape such as a diamond shape, a rhombus shape, or the like, or can be various shapes such as a triangle, a pentagon, or a hexagon, or the like. Each of the plurality of open areas OA can have various shapes depending on a shape of the touch electrode TE or a mesh shape of the touch sensor metal TSM.

At least one dummy metal DM created (e.g., cut) from the touch sensor metal TSM of a mesh type can be present on an area of the touch electrode TE (Case 2). The dummy metal DM can be positioned to be surrounded by the touch sensor metal TSM on an area of the touch electrode TE. The dummy metal DM, differently from the touch sensor metal TSM, is a portion that the touch driving signal is not applied and the touch sensing signal is not detected, can be a floated metal. The touch sensor metal TSM can be electrically connected to the touch driving circuit TDC, but the dummy metal DM is not electrically connected to the touch driving circuit TDC.

One or more dummy metal DM can be present on an area of each of all touch electrodes TE as a state to be cut from the touch sensor metal TSM. Alternatively, one or more dummy metal DM can be present on an area of some of all the touch electrodes TE as a state to be cut from the touch sensor metal TSM, and the dummy metal DM may not be present on an area of other some touch electrode TE.

Related to functions of the dummy metal DM, in a case that one or more dummy metal DM is not present on an area of the touch electrode TE and only the touch sensor metal TSM is present as a mesh type, a visibility issue that an outline of the touch sensor metal TSM is visible can be occurred. Whereas, in the case that one or more dummy metal DM is present on an area of the touch electrode TE, the visibility issue that the outline of the touch sensor metal TSM is visible on an image can be prevented or at least reduced.

By adjusting whether the dummy metal DM is present or not, or the number (a ratio of the dummy metal) for each touch electrode TE, a size of a capacitance can be adjusted for each touch electrode TE and a touch sensitivity can be improved.

By cutting (or etching) some points of the touch sensor metal TSM formed on an area of one touch electrode TE, cut touch sensor metal TSM can be formed as the dummy metal DM. The touch sensor metal TSM and the dummy metal DM can be a same material formed on a same layer.

If a plurality of dummy metal DM being present on an area of one touch electrode TE is omitted and only touch sensor metal TSM is illustrated, a plurality of dummy areas DMA can be present on an area where the touch sensor metal TSM is disposed. The plurality of dummy areas DMA is an area corresponded to the plurality of dummy metal DM.

By a mesh shape of the touch electrode TE or a structure including the dummy metal DM, a touch sensing function can be implemented without affecting a display driving by a light emitted from the light-emitting element ED positioned under the touch electrode TE.

Such as described above, the touch sensing function can be implemented without affecting the display driving, but an electrode or a signal line or the like for the display driving is disposed under the touch electrode TE, thus a noise can be occurred in a signal detected from the touch electrode TE due to a parasitic capacitance by the electrode or the like for the display driving.

Embodiments of the present disclosure can provide methods being capable of improving a touch sensing performance by the touch electrode TE disposed on the encapsulation layer ENCAP, by arranging a configuration being capable of blocking a noise generated by the electrode or the like for the display driving.

Figure 6:
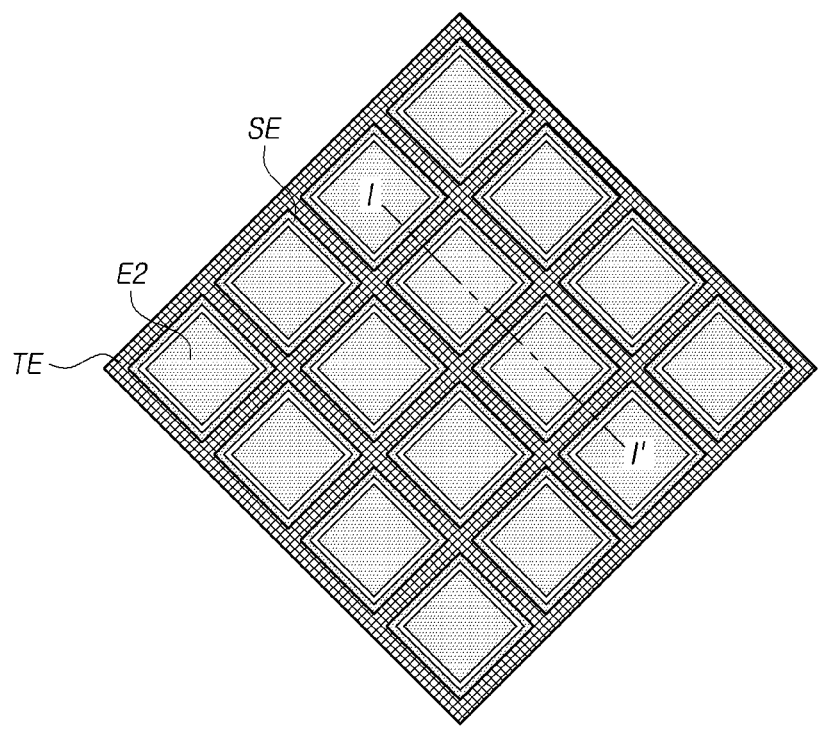
FIG. 6 is a diagram illustrating an example of a plane structure that a touch electrode and a shield electrode included in a touch display device are disposed according to embodiments of the present disclosure.
Figure 7:
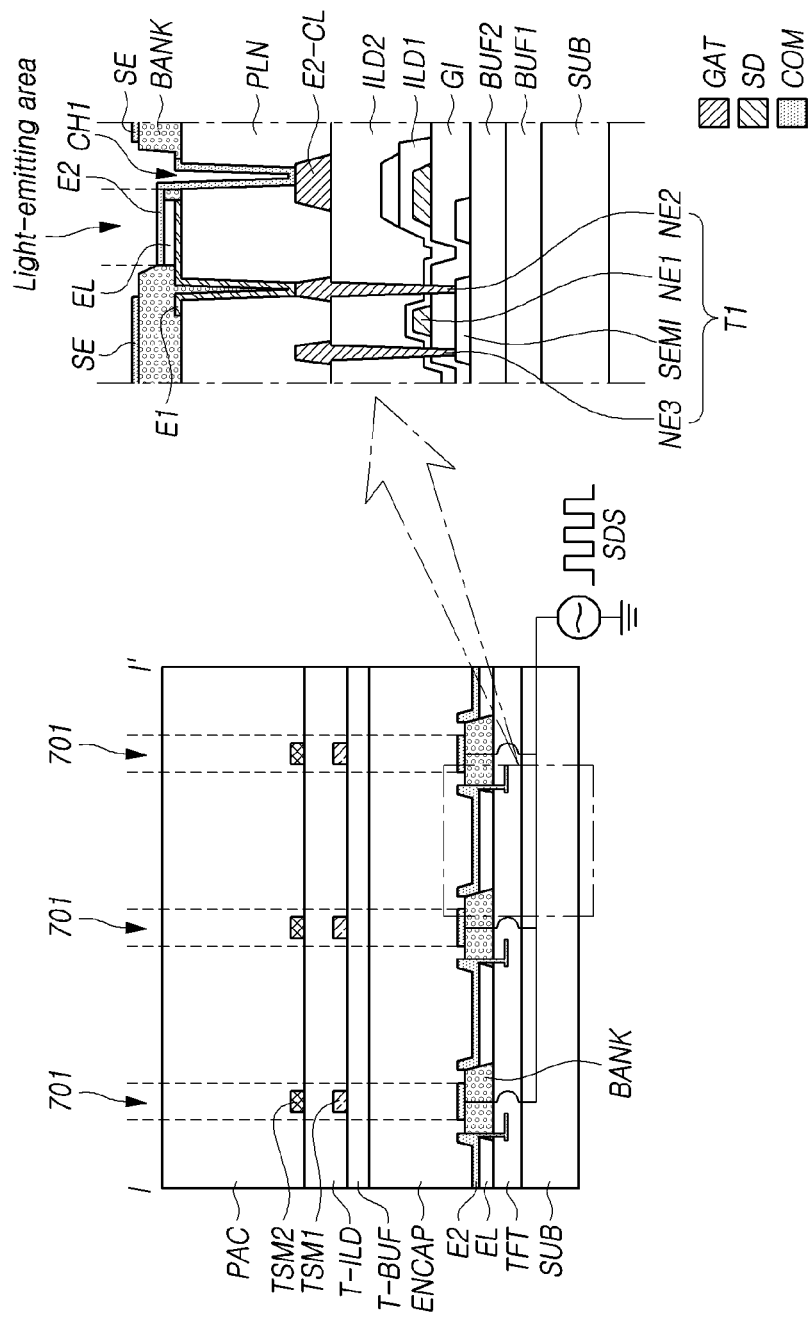
FIG. 7 is a cross-sectional view of I-I' portion illustrated in FIG. 6 according to embodiments of the present disclosure.

FIG. 6 is a diagram illustrating an example of a plane structure that the touch electrode TE and a shield electrode SE included in the touch display device are disposed according to embodiments of the present disclosure. FIG. 7 is a cross-sectional view of I-I' portion illustrated in FIG. 6 according to embodiments of the present disclosure.

Referring to FIG. 6, the touch electrode TE, such as an example above-mentioned, can be a mesh shape including the plurality of open areas OA. The open area OA included in the touch electrode TE can be positioned to be corresponded to the light-emitting area of the subpixel SP. FIG. 6 illustrates a case that the touch electrode TE is a rhombus shape as an example, but the touch electrode TE can be various shapes including the open areas OA.

The touch electrode TE can be positioned on the encapsulation layer ENCAP. The second electrode E2 of the light-emitting element ED can be positioned under the encapsulation layer ENCAP. The second electrode E2 can be referred to "a common electrode".

The second electrode E2 can be disposed to be corresponded to the light-emitting area of the subpixel SP. The second electrode E2 disposed on each of subpixels SP can be disposed to be divided on a layer where the second electrode E2 is disposed.

The second electrode E2 can be electrically connected to each other by a connecting pattern positioned on a layer different from a layer where the second electrode E2 is disposed.

The shield electrode SE can be disposed to be separated from the second electrode E2. The shield electrode SE can be disposed on a layer where the second electrode E2 is disposed. The shield electrode SE can be made of a same material to the second electrode E2.

The shield electrode SE can be disposed to be integral on a layer where the shield electrode SE is positioned.

The shield electrode SE can be positioned on an area overlapping the touch electrode TE. Furthermore, the shield electrode SE can be positioned on an area including an area overlapping the touch electrode TE.

The second electrode E2 and the shield electrode SE can be disposed on a same layer, and can be disposed to be separated from each other. The second electrode E2 and the shield electrode SE can be disposed to be physically separated, and to be electrically separated.

As the touch electrode TE does not overlap the second electrode E2, a parasitic capacitance formed between the touch electrode TE and the second electrode E2 can be reduced.

As the shield electrode SE is disposed on an area overlapping the touch electrode TE, a direct parasitic capacitance between a signal line positioned under the shield electrode SE and the touch electrode TE may not be formed.

Due to an arrangement of the shield electrode SE, a noise created by an electrode or a signal line for the display driving that affects a signal detected from the touch electrode TE is prevented or at least reduced.

A signal corresponding to a signal supplied to the touch electrode TE can be supplied to the shield electrode SE.

A parasitic capacitance between the shield electrode SE and the touch electrode TE may not be formed, or can be reduced. The shield electrode SE may not affect a signal detected from the touch electrode TE. A noise blocking performance by the shield electrode SE can be improved.

One (e.g., the shield electrode SE) of the second electrode E2 and the shield electrode SE can be electrically connected to each other on a layer where the second electrode E2 is disposed. The other (e.g., the second electrode E2) of the second electrode E2 and the shield electrode SE can be electrically connected to each other by a connecting pattern positioned under a layer where the second electrode E2 is disposed.

Referring to FIG. 7, a thin film transistor layer TFT where a transistor is positioned can be positioned on the substrate SUB. The light-emitting element ED can be positioned on the thin film transistor layer TFT. The encapsulation layer ENCAP can be positioned on the light-emitting element ED.

A structure for the touch sensing can be disposed on the encapsulation layer ENCAP. A first touch sensor metal TSM1 and a second touch sensor metal TSM2 can be disposed as an electrode for the touch sensing.

The second electrode E2 of the light-emitting element ED can be disposed to be corresponded to the light-emitting area of the subpixel SP.

The shield electrode SE can be disposed to be separated from the second electrode E2. The shield electrode SE can be disposed on the bank BANK. The shield electrode SE can be disposed to be integral on the bank BANK.

The shield electrode SE, such as a portion indicated by 701 in FIG. 7, can be disposed on an area including an area overlapping the touch sensor metal TSM.

A parasitic capacitance between the touch sensor metal TSM and the second electrode E2 can be reduced. A direct parasitic capacitance between the touch sensor metal TSM and a signal line positioned under the shield electrode SE may not be formed.

A shield driving signal SDS can be supplied to the shield electrode SE. The shield driving signal SDS can be a signal corresponding to a signal supplied to the touch electrode TE. The signal corresponding to the signal supplied to the touch electrode TE can mean a signal that at least one of a frequency, a phase or an amplitude is identical to the signal supplied to the touch electrode TE.

As the shield driving signal SDS is supplied to the shield electrode SE, a parasitic capacitance between the shield electrode SE and the touch sensor metal TSM may not be formed. It can be prevented that the second electrode E2 or a signal line positioned under the second electrode E2 affects a signal detected through the touch sensor metal TSM.

The second electrode E2 can be electrically connected by a connecting pattern or a connecting line positioned between the substrate SUB and a layer where the light-emitting element ED is disposed.

For example, a planarization film PLN can be disposed under a layer where the light-emitting element ED is disposed.

Various metals GAT, SD for constituting a transistor and a signal line and various insulating film BUF1, BUF2, GI, ILD1, ILD2 can be disposed under the planarization film PLN.

The second electrode E2 can be electrically connected to a second electrode connecting line E2-CL through a first contact hole CH1 positioned in the planarization film PLN. The second electrode E2 can be supplied the base voltage VSS through the second electrode connecting line E2-CL. The second electrode E2 can be electrically connected to the second electrode E2 positioned on other subpixel SP through the second electrode connecting line E2-CL. The second electrode E2 can be separated from a side surface of the first electrode E1 by the bank BANK positioned on side surfaces of the first electrode E1 and the light-emitting layer EL. The second electrode E2 can be also separated from a side surface of the light-emitting layer EL by the bank BANK. Alternatively, the second electrode E2 can be separated from the side surface of the first electrode E1 and can contact the side surface of the light-emitting layer EL. Alternatively, the light-emitting layer EL can be disposed between the side surface of the first electrode E1 and the second electrode E2. In this case, the light-emitting layer EL can be disposed to surround the side surface of the first electrode E1, and the first electrode E1 and the second electrode E2 can be separated from each other without the bank BANK.

The second electrode connecting line E2-CL can be made of a source drain metal SD, but in some cases, can be made of other metal such as a gate metal GAT.

The first contact hole CH1 can be positioned outside of the light-emitting area of the subpixel SP. The first contact hole CH1 can be positioned adjacently to a boundary of the light-emitting area of the subpixel SP. The first contact hole CH1 can be positioned between the light-emitting area of the subpixel SP and the bank BANK.

The bank BANK can be disposed on an area other than an area where the light-emitting area of the subpixel SP and the first contact hole CH1 are disposed. The shield electrode SE made of a common electrode metal COM which is a same material to the second electrode E2 can be disposed on at least a part area on the bank BANK.

As the shield electrode SE is disposed on an area overlapping the touch sensor metal TSM under the encapsulation layer ENCAP, thus a parasitic capacitance being capable of forming between the touch electrode TE and an electrode or a signal line for the display driving can be reduced or blocked.

The shield electrode SE can be supplied different shield driving signal SDS depending on a signal supplied to the touch electrode TE overlapping the shield electrode SE. The shield electrode SE can be supplied the shield driving signal SDS through a line disposed on the active area AA or the non-active area NA.

Figure 8:
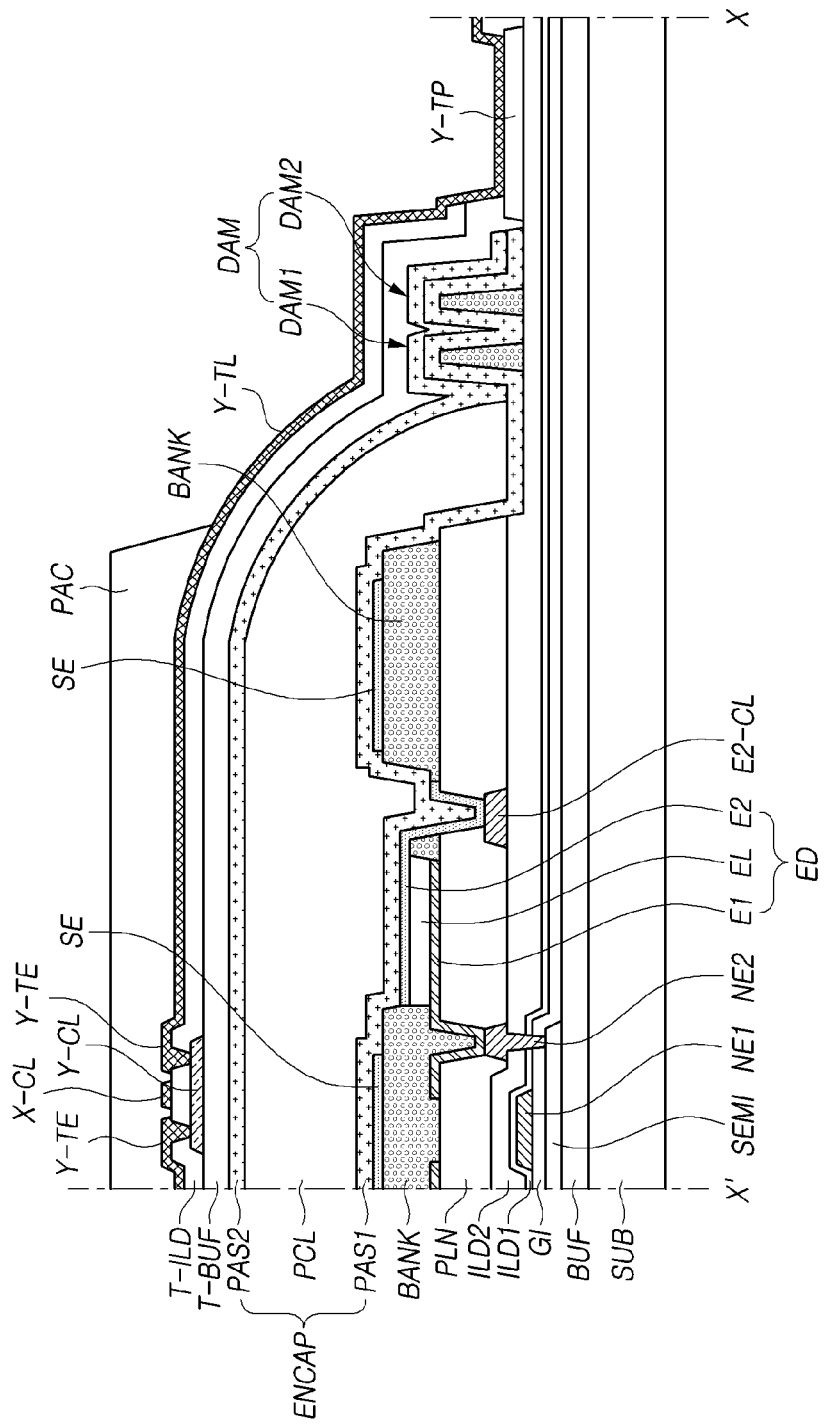
FIG. 8 is a partial cross-sectional view of a touch display device and is a diagram illustrating an example of a cross-sectional structure of X-X' portion illustrated in FIG. 5 according to embodiments of the present disclosure.
Figure 9:
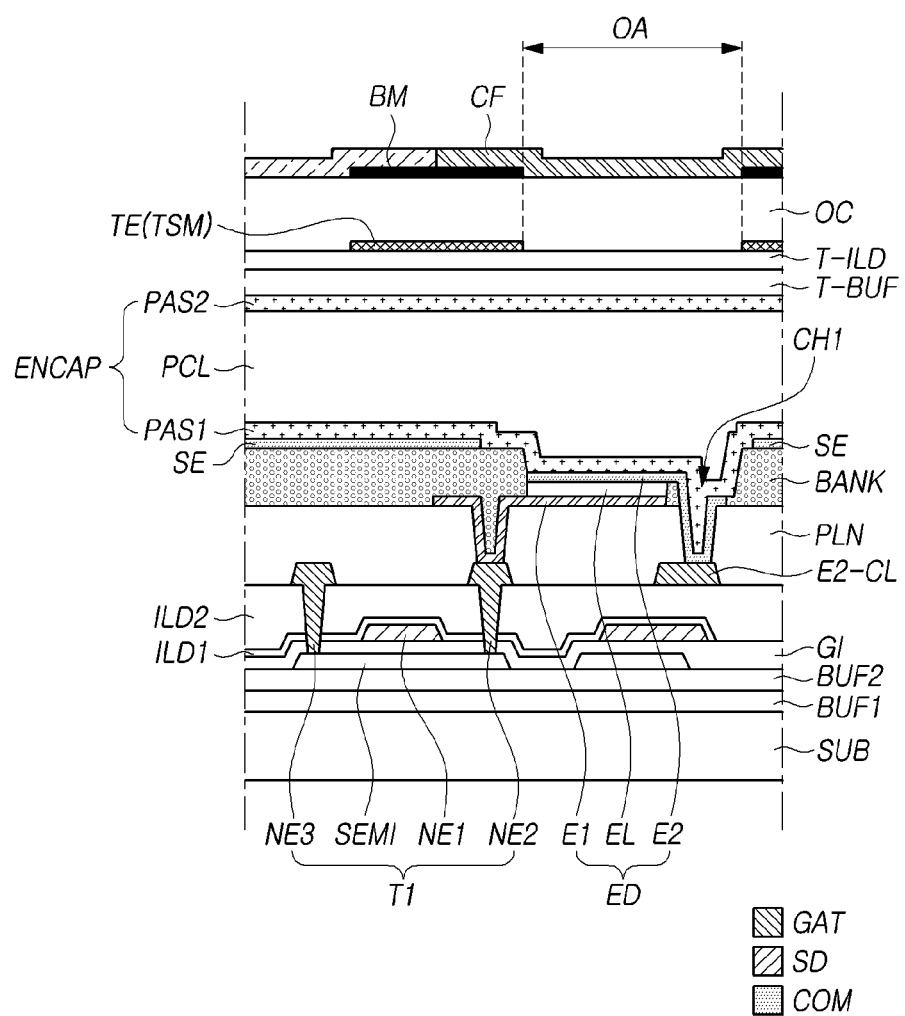
FIGS. 9 and 10 are partial cross-sectional views of a touch display device, and is a diagram exemplary illustrating a cross-sectional structure in a case that a color filter is included in the touch display device according to embodiments of the present disclosure.
Figure 10:
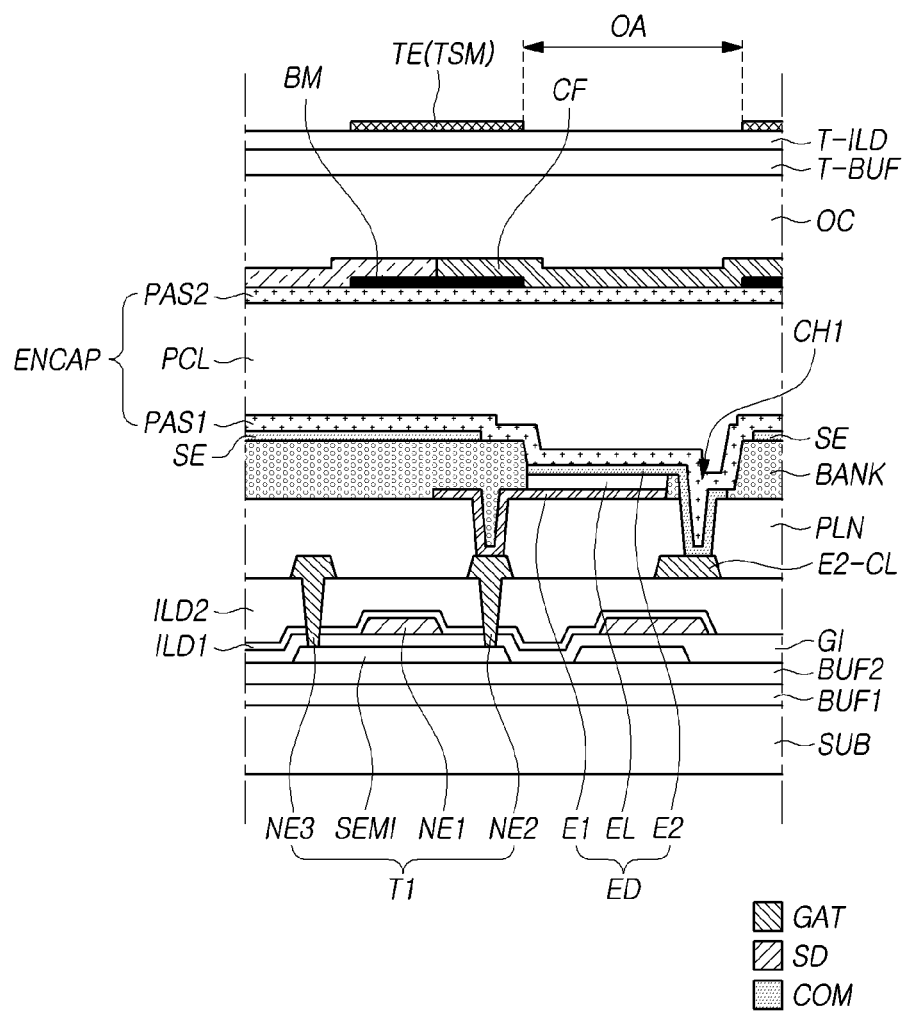

FIGS. 8 to 10 illustrate example of a partial cross-sectional structure in the touch display device that the shield electrode SE is disposed on a part area of a layer where the second electrode E2 is disposed according to one embodiment.

FIG. 8 is a partial cross-sectional view of the touch display device and is a diagram illustrating an example of a cross-sectional structure of X-X' portion illustrated in FIG. 5 according to embodiments of the present disclosure. For the convenience of a description, the touch electrode TE is illustrated as a plate shape in FIG. 8, but it can be disposed as a mesh type. In the case that the touch electrode TE is a mesh type, the open area OA of the touch electrode TE can be positioned on the light-emitting area of the subpixel SP.

The first transistor T1, i.e., the driving transistor in each of the subpixels SP in the active area AA, is disposed on the substrate SUB.

The first transistor T1 comprises a first node electrode NE1 corresponding to the gate electrode, a second node electrode NE2 corresponding to a source electrode or a drain electrode, a third node electrode NE3 corresponding to a drain electrode or a source electrode, a semiconductor layer SEMI, and the like.

The first node electrode NE1 and the semiconductor layer SEMI can be located on both sides of a gate insulating film GI to overlap each other. The second node electrode NE2 can be provided on an insulating layer ILD to be in contact with one side of the semiconductor layer SEMI, while the third node electrode NE3 can be provided on the insulating layer ILD to be in contact with the other side of the semiconductor layer SEMI.

The emitting device ED can comprise a first electrode E1 corresponding to an anode (or cathode), an emitting layer EL provided on the first electrode E1, a second electrode E2 corresponding to a cathode (or anode) provided on the emitting layer EL, and the like. The second electrode E2 of each of two or more light-emitting element ED can be electrically connected to each other. In the present disclosure, the second electrode E2 can be referred to "a common electrode".

The second electrode E2 can be disposed to be corresponded to the light-emitting area of the light-emitting element ED. A portion of the second electrode E2 can be disposed on the bank BANK, in some cases, such as an example illustrated in FIG. 8, may not be disposed on the bank BANK.

The shield electrode SE can be disposed to be separated from the second electrode E2. The shield electrode SE can be disposed on at least a part area on the bank BANK.

The first electrode E1 is electrically connected to the second node electrode NE2 of the first transistor T1, exposed through a contact hole extending through the planarization film PLN. The second electrode E2 can be electrically connected to a second electrode connecting line E2-CL through a contact hole extending through the planarization film PLN.

The emitting layer EL is provided on the first electrode E1 in the emitting area provided by banks BANK. The emitting layer EL is provided on the first electrode E1 and is comprised of a hole-related layer, an emissive layer, and an electron-related layer stacked in the stated order or inversely. The second electrode E2 is provided on the side of the emitting layer EL opposite to the first electrode E1.

The encapsulation layer ENCAP prevents or at least reduces external moisture or oxygen from penetrating the emitting device ED vulnerable to external moisture, oxygen, or the like.

The encapsulation layer ENCAP can be a single layer or, as illustrated in FIG. 9, be comprised of a plurality of layers PAS1, PCL, and PAS2.

For example, in a case in which the encapsulation layer ENCAP is comprised of the plurality of layers PAS1, PCL, and PAS2, the encapsulation layer ENCAP can comprise one or more inorganic encapsulation layers PAS1 and PAS2 and one or more organic encapsulation layers PCL. As a specific example, the encapsulation layer ENCAP can have a structure in which the first inorganic encapsulation layer PAS1, the organic encapsulation layer PCL, and the second inorganic encapsulation layer PAS2 are stacked in order.

Here, the organic encapsulation layer PCL can further comprise at least one organic encapsulation layer or at least one inorganic encapsulation layer.

The first inorganic encapsulation layer PAS1 is provided on the substrate SUB, on which the second electrode E2 corresponding to the cathode is provided, so as to be closest to the emitting device ED. The first inorganic encapsulation layer PAS1 is made of an inorganic insulating material, such as silicon nitride (SiNx), silicon oxide (SiOx), silicon oxynitride (SiON), or aluminum oxide ($Al_2O_3$), which can be deposited at a low temperature. Since the first inorganic encapsulation layer PAS1 is deposited in a low-temperature atmosphere, the first inorganic encapsulation layer PAS1 can prevent or at least reduce the emitting layer EL containing an organic material vulnerable to a high-temperature atmosphere from being damaged during deposition processing.

The organic encapsulation layer PCL can be provided in an area that is smaller than the area of the first inorganic encapsulation layer PAS1. In this case, the organic encapsulation layer PCL can be configured to expose both edges of the first inorganic encapsulation layer PAS1. The organic encapsulation layer PCL can serve as a buffer to reduce stress between the layers caused by bending of the touch display device and serve to enhance planarization performance. The organic encapsulation layer PCL can be made of, for example, an organic insulating material, such as an acrylic resin, an epoxy resin, polyimide, polyethylene, silicon oxycarbon (SiOC).

In addition, in a case in which the organic encapsulation layer PCL is fabricated by inkjet printing, one or more dams DAM can be provided in the dam area DA corresponding to the boundary between the non-active area NA and the active area AA or a portion of the non-active area NA.

For example, as illustrated in FIG. 8, the dam area DA is located between a pad area in the non-active area NA and the active area AA. The pad area refers to a portion of the non-active area NA in which the plurality of X-touch pads X-TP and the plurality of Y-touch pads Y-TP are provided. In the dam area DA, the first dam DAM1 adjacent to the active area AA and the second dam DAM2 adjacent to the pad area can be provided.

The one or more dams DAM disposed in the dam area DA can prevent or at least reduce the organic encapsulation layer PCL in a liquid form from collapsing in the direction of the non-active area NA and penetrating into the pad area when the organic encapsulation layer PCL in the liquid form is dropped to the active area AA.

This effect can be further increased by the provision of the first dam DAM1 and the second dam DAM2 as illustrated in FIG. 8.

At least one of the first dam DAM1 and the second dam DAM2 can have a single layer or multilayer structure. For example, at least one of the first dam DAM1 and the second dam DAM2 can be simultaneously made of the same material as at least one of the banks BANK and spacers (not shown). In this case, a dam structure can be provided without additional mask processing or an increase in cost.

In addition, as illustrated in FIG. 9, at least one of the first dam DAM1 and the second dam DAM2 can have a structure in which at least one of the first inorganic encapsulation layer PAS1 and the second inorganic encapsulation layer PAS2 is stacked on the banks BANK.

In addition, the organic encapsulation layer PCL containing an organic material can be located on an inner side of the first dam DAM1, as illustrated in FIG. 8.

Alternatively, the organic encapsulation layer PCL containing an organic material can be located above at least a portion of the first dam DAM1 and the second dam DAM2. For example, the organic encapsulation layer PCL can be located above the first dam DAM1.

The second inorganic encapsulation layer PAS2 can be provided on the substrate SUB on which the organic encapsulation layer PCL is provided, so as to cover the top surfaces and side surfaces of the organic encapsulation layer PCL and the first inorganic encapsulation layer PAS1. The second inorganic encapsulation layer PAS2 reduces or prevents external moisture or oxygen from penetrating the first inorganic encapsulation layer PAS1 or the organic encapsulation layer PCL. The second inorganic encapsulation layer PAS2 is made of, for example, an inorganic insulating material, such as SiNx, SiOx, SiON, or $Al_2O_3$.

A touch buffer film T-BUF can be provided on the encapsulation layer ENCAP. The touch buffer film T-BUF can be located between the touch sensor metal TSM, including the X and Y-touch electrodes X-TE and Y-TE and X and Y-touch electrode connecting lines X-CL and Y-CL, and the second electrode E2 of the emitting device ED.

The touch buffer film T-BUF can be designed to maintain a predetermined minimum distance (e.g., 1 μm) between the touch sensor metal TSM and the second electrode E2 of the emitting device ED. Accordingly, the touch buffer film T-BUF can reduce or prevent parasitic capacitance generated between the touch sensor metal TSM and the second electrode E2 of the emitting device ED, thereby preventing touch sensitivity from being reduced by the parasitic capacitance.

Without the touch buffer film T-BUF, the touch sensor metal TSM comprising the X and Y-touch electrodes X-TE and Y-TE and the X and Y-touch electrode connecting lines X-CL and Y-CL can be disposed on the encapsulation layer ENCAP.

In addition, the touch buffer film T-BUF can prevent or at least reduce the emitting layer EL containing the organic material from being penetrated by a chemical agent (e.g., a developing solution or an etching solution) used in fabrication processing of the touch sensor metal TSM disposed on the touch buffer film T-BUF, external moisture, or the like. Accordingly, the touch buffer film T-BUF can prevent the emitting layer EL vulnerable to the chemical agent or moisture from being damaged.

The touch buffer film T-BUF is made of an organic insulating material producible at a low temperature equal to or lower than a predetermined temperature (e.g., 100° C.) and having a low dielectric constant of 1 to 3 in order to prevent the emitting layer EL containing the organic material vulnerable to high temperature from being damaged. For example, the touch buffer film T-BUF can be made of an epoxy-based material or a siloxane-based material. The touch buffer film T-BUF made of an inorganic insulating material and having a planarization performance can prevent the layers PAS1, PCL, and PAS2 included in the encapsulation layer ENCAP from being damaged or the touch sensor metal TSM on the touch buffer film T-BUF from being fractured in response to the bending of the OLED display device.

According to the mutual capacitance-based touch sensor structure, the X-touch electrode lines X-TEL and the Y-touch electrode lines Y-TEL are disposed on the touch buffer film T-BUF, and the X-touch electrode lines X-TEL and the Y-touch electrode lines Y-TEL can be disposed such that the X-touch electrode lines X-TEL intersect the Y-touch electrode lines Y-TEL.

The Y-touch electrode lines Y-TEL can comprise the plurality of Y-touch electrodes Y-TE and the plurality of Y-touch electrode connecting lines Y-CL electrically connecting the plurality of Y-touch electrodes Y-TE.

As illustrated in FIG. 8, the plurality of Y-touch electrodes Y-TE and the plurality of Y-touch electrode connecting lines Y-CL can be disposed on different layers, on both sides of a touch insulating film T-ILD.

The plurality of Y-touch electrodes Y-TE can be spaced apart from each other by predetermined distances in the Y-axis direction. Each of the plurality of Y-touch electrodes Y-TE can be electrically connected to the other adjacent Y-touch electrodes Y-TE through the Y-touch electrode connecting lines Y-CL in the Y-axis direction.

The Y-touch electrode connecting lines Y-CL can be provided on the touch buffer film T-BUF and exposed through touch contact holes extending through the touch insulating film T-ILD to be electrically connected to the two adjacent Y-touch electrodes Y-TE in the Y-axis direction.

The Y-touch electrode connecting lines Y-CL can be disposed to overlap the banks BANK. Accordingly, the aperture ratio can be prevented from being decreased by the Y-touch electrode connecting lines Y-CL.

The X-touch electrode lines X-TEL can comprise the plurality of X-touch electrodes X-TE and the plurality of X-touch electrode connecting lines X-CL electrically connecting the plurality of X-touch electrodes X-TE. The plurality of X-touch electrodes X-TE and the plurality of X-touch electrode connecting line X-CL can be disposed on different layers, on both sides of the touch insulating film T-ILD.

The plurality of X-touch electrodes X-TE can be disposed on the touch insulating film T-ILD, spaced apart from each other by predetermined distances in the X-axis direction. Each of the plurality of X-touch electrodes X-TE can be electrically connected to the adjacent other X-touch electrodes X-TE through the X-touch electrode connecting lines X-CL in the X-axis direction.

The X-touch electrode connecting lines X-CL can be disposed on the same plane as the X-touch electrodes X-TE to be electrically connected to the two adjacent X-touch electrodes X-TE in the X-axis direction without separate contact holes or be integrated with the two adjacent X-touch electrodes X-TE in the X-axis direction.

The X-touch electrode connecting lines X-CL can be disposed to overlap the banks BANK. Accordingly, the aperture ratio can be prevented from being decreased by the X-touch electrode connecting lines X-CL.

In addition, the Y-touch electrode lines Y-TEL can be electrically connected to the touch driving circuit TDC through the Y-touch routing lines Y-TL and the Y-touch pads Y-TP. In the same manner, the X-touch electrode lines X-TEL can be electrically connected to the touch driving circuit TDC through the X-touch routing lines X-TL and the X-touch pads X-TP.

A pad cover electrode covering the X-touch pads X-TP and the Y-touch pads Y-TP can be further disposed.

The X-touch pads X-TP can be provided separately from the X-touch routing lines X-TL or be provided as extensions of the X-touch routing lines X-TL. The Y-touch pads Y-TP can be provided separately from the Y-touch routing lines Y-TL or be provided as extensions of the Y-touch routing lines Y-TL.

In a case in which the X-touch pads X-TP are extensions of the X-touch routing lines X-TL and the Y-touch pads Y-TP are extensions of the Y-touch routing lines Y-TL, the X-touch pads X-TP, the X-touch routing lines X-TL, the Y-touch pads Y-TP, and the Y-touch routing lines Y-TL can be comprised of the same material, i.e., a first conductive material. The first conductive material can have a single or multilayer structure made of a metal, such as aluminum Al, titanium Ti, copper Cu, or molybdenum Mo, having high corrosion resistance, high acid resistance, and high conductivity.

For example, each of the X-touch pads X-TP, the X-touch routing lines X-TL, the Y-touch pads Y-TP, and the Y-touch routing lines Y-TL comprised of the first conductive material can have a three-layer structure, such as Ti/Al/Ti or Mo/Al/Mo.

The pad cover electrode capable of covering the X-touch pads X-TP and the Y-touch pads Y-TP can be comprised of the same material as the X and Y-touch electrodes X-TE and Y-TE, i.e., a second conductive material. The second conductive material can be a transparent conductive material, such as indium tin oxide (ITO) or indium zinc oxide (IZO), having high corrosion resistance and acid resistance. The pad cover electrodes can be provided to be exposed from the touch buffer film T-BUF so as to be bonded to the touch driving circuit TDC or to a circuit film on which the touch driving circuit TDC is mounted.

The touch buffer film T-BUF can be provided to cover the touch sensor metal TSM so as to prevent or at least reduce the touch sensor metal TSM from being corroded by external moisture. For example, the touch buffer film T-BUF can be made of an organic insulating material or be provided as a circular polarizer or a film made of an epoxy or acrylic material. The touch buffer film T-BUF may not be provided on the encapsulation layer ENCAP. That is, the touch buffer film T-BUF may not be an essential component.

The Y-touch routing lines Y-TL can be electrically connected to the Y-touch electrodes Y-TE via touch routing line contact holes or be integrated with the Y-touch electrodes Y-TE.

Each of the Y-touch routing lines Y-TL can extend to the non-active area NA, past the top and side portions of the encapsulation layer ENCAP and the dams DAM, so as to be electrically connected to the Y-touch pads Y-TP. Accordingly, the Y-touch routing lines Y-TL can be electrically connected to the touch driving circuit TDC through the Y-touch pads Y-TP.

The Y-touch routing lines Y-TL can deliver the touch-sensing signal from the Y-touch electrodes Y-TE to the touch driving circuit TDC or deliver the touch driving signal, received from the touch driving circuit TDC, to the Y-touch electrodes Y-TE.

The X-touch routing lines X-TL can be electrically connected to the X-touch electrodes X-TE via the touch routing line contact holes or be integrated with the X-touch electrodes X-TE.

The X-touch routing lines X-TL can extend to the non-active area NA, past the top and side portions of the encapsulation layer ENCAP and the dams DAM, so as to be electrically connected to the X-touch pads Y-TP. Accordingly, the X-touch routing lines X-TL can be electrically connected to the touch driving circuit TDC through the X-touch pads X-TP.

The X-touch routing lines X-TL can deliver the touch driving signal, received from the touch driving circuit TDC, to the X-touch electrodes X-TE or deliver touch-sensing signal from the X-touch electrodes X-TE to the touch driving circuit TDC.

The arrangement of the X-touch routing lines X-TL and the Y-touch routing lines Y-TL can be modified variously depending on the design specification of the panel.

A touch protective film PAC can be disposed on the X-touch electrodes X-TE and the Y-touch electrodes Y-TE. The touch protective film PAC can extend to an area in front of or behind the dams DAM so as to be disposed on the X-touch routing lines X-TL and the Y-touch routing lines Y-TL.

The cross-sectional diagram of FIG. 8 is conceptual illustration of the structure. The positions, thicknesses, or widths of the patterns (e.g., various layers or electrodes) can vary depending on the direction or position of view, the structures for connecting the patterns can be modified, additional layers other than the plurality of illustrated layers can be further provided, and some of the plurality of illustrated layers can be omitted or integrated. For example, the width of the banks BANK can be narrower than that illustrated in the drawings, and the height of the dams DAM can be lower or higher than that illustrated in the drawings. In addition, the cross-sectional diagram of FIG. 8 illustrates a structure in which the touch electrode TE, the touch routing lines TL, and the like are disposed on the entirety of the subpixels SP in order to illustrate a structure connected to the touch pads TP along inclines of the touch routing lines TL and the encapsulation layer ENCAP. However, in a case in which the touch electrode TE or the like is mesh-shaped as described above, the open areas OA of the touch electrode TE can be located above the emitting areas of the subpixels SP. In addition, a color filter CF can be further disposed on the encapsulation layer ENCAP. The color filter CF can be located on the touch electrode TE or between the encapsulation layer ENCAP and the touch electrode TE.

FIGS. 9 and 10 are partial cross-sectional views of the touch display device and is a diagram exemplary illustrating a cross-sectional structure in the case that the color filter CF is included in the touch display device according to embodiments of the present disclosure.

Referring to FIGS. 9 and 10, in a case in which the touch panel TSP is disposed within the display panel DISP and the display panel DISP is provided as an OLED display panel, the touch panel TSP can be located on the encapsulation layer ENCAP in the display panel DISP. That is, the touch sensor metals TSM, such as the plurality of touch electrodes TE and the plurality of touch routing lines TL, can be located on the encapsulation layer ENCAP in the display panel DISP.

The touch electrode TE being provided on the encapsulation layer ENCAP as described above can be made as the touch electrode TE without significantly influencing the display performance or the formation of a display-related layer.

Referring to FIGS. 9 and 10, the second electrode E2 that can be the cathode of the OLED can be located below the encapsulation layer ENCAP. The second electrode E2 can be disposed to be corresponded to the light-emitting area of the subpixel SP. The second electrode E2 can be disposed on an area other than an area where the bank BANK is disposed. In some cases, a portion of the second electrode E2 can be disposed on the bank BANK.

The shield electrode SE can be disposed to be separated from the second electrode E2. The shield electrode SE can be disposed on at least a part area on the bank BANK. The shield electrode SE can be disposed to overlap the touch sensor metal TSM positioned on the encapsulation layer ENCAP.

The thickness T of the encapsulation layer ENCAP can be, for example, 1 µm or more.

Since the thickness of the encapsulation layer ENCAP is designed to be 1 µm or more as described above, parasitic capacitance generated between the second electrode E2 and the touch electrodes TE of the OLED can be reduced, thereby preventing touch sensitivity from being reduced by the parasitic capacitance. Furthermore, as the second electrode E2 is positioned not to overlap the touch electrode TE, a parasitic capacitance between the second electrode E2 and the touch electrode TE can be reduced more.

As described above, each of the plurality of touch electrodes TE is patterned in the shape of a mesh, in which the electrode metal EM has two or more open areas OA. Each of the two or more open areas OA can correspond to one or more subpixels or the emitting areas of one or more subpixels when viewed in a vertical direction.

As described above, the electrode metal EM of the touch electrode TE can be patterned such that the emitting area of one or more subpixels SP is provided in a position corresponding to each of the two or more open areas OA present in the area of the touch electrode TE when viewed in a plan view. Accordingly, the luminous efficiency of the display panel DISP can be improved.

As illustrated in FIGS. 9 and 10, a black matrix BM can be provided in the display panel DISP. The color filter CF can be further provided in the display panel DISP.

The position of the black matrix BM can correspond to the position of the electrode metal EM of the touch electrode TE.

The positions of the plurality of color filters CF correspond to the positions of the plurality of touch electrodes TE or the position of the electrode metal EM constituting the plurality of touch electrodes TE.

Since the plurality of color filters CF are located in positions corresponding to the plurality of open areas OA as described above, the luminous performance of the display panel DISP can be improved.

The vertical positional relationship between the plurality of color filters CF and the plurality of touch electrodes TE will be described as follows.

As illustrated in FIG. 9, the plurality of color filters CF and the black matrix BM can be located on the plurality of touch electrodes TE.

In this case, the plurality of color filters CF and the black matrix BM can be located on the overcoat layer OC disposed on the plurality of touch electrodes TE. Here, the overcoat layer OC can be the same layer as or a different layer from the touch protective film PAC illustrated in FIG. 8.

Alternatively, as illustrated in FIG. 10, the plurality of color filters CF and the black matrix BM can be located below the plurality of touch electrodes TE.

In this case, the plurality of touch electrodes TE can be located on the overcoat layer OC on the plurality of color filters CF and the black matrix BM. The overcoat layer OC can be the same layer as or a different layer from the touch buffer film T-BUF or the touch insulating film T-ILD illustrated in FIG. 8. Alternatively, the touch buffer film T-BUF or the touch insulating film T-ILD can be disposed in a manner separate from the overcoat layer OC.

Such as describe above, due to the vertical positional relationship between the touch electrode TE and a display driving configuration being adjusted as described above, a touch sensing configuration can be disposed without degrading the display performance.

Figure 11:
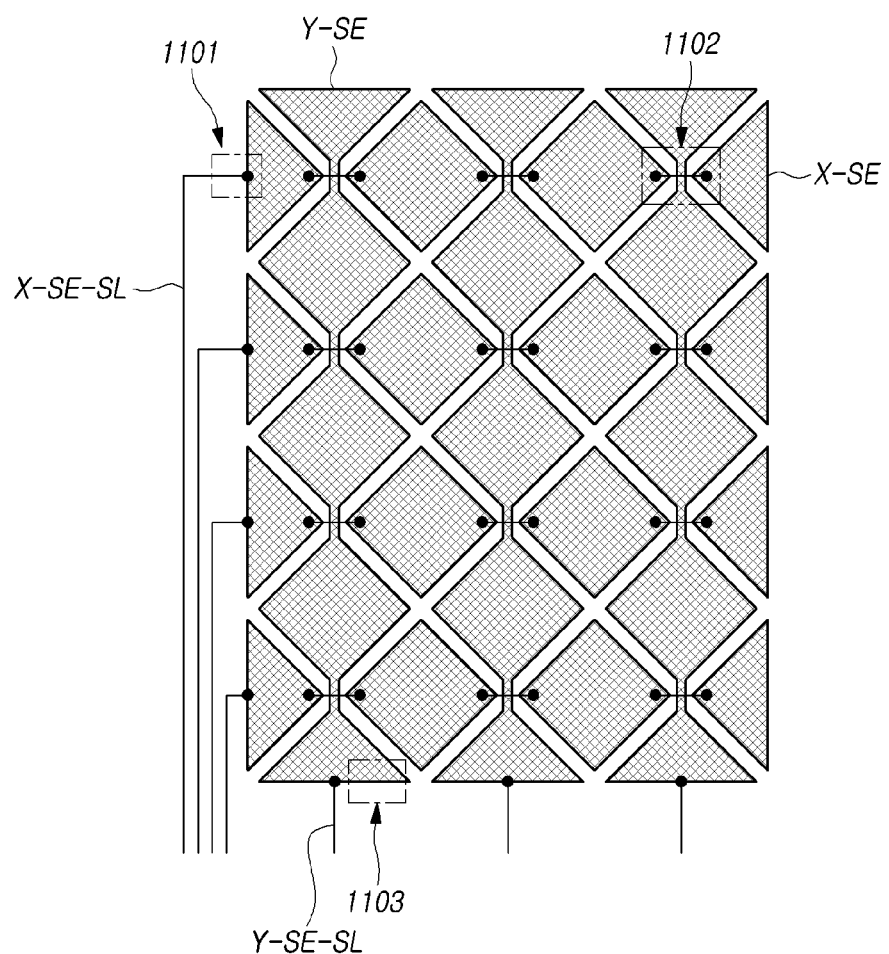
FIG. 11 is a diagram illustrating an example of a plane structure that a shield electrode included in a touch display device is disposed in a display panel entirely according to embodiments of the present disclosure.
Figure 12:
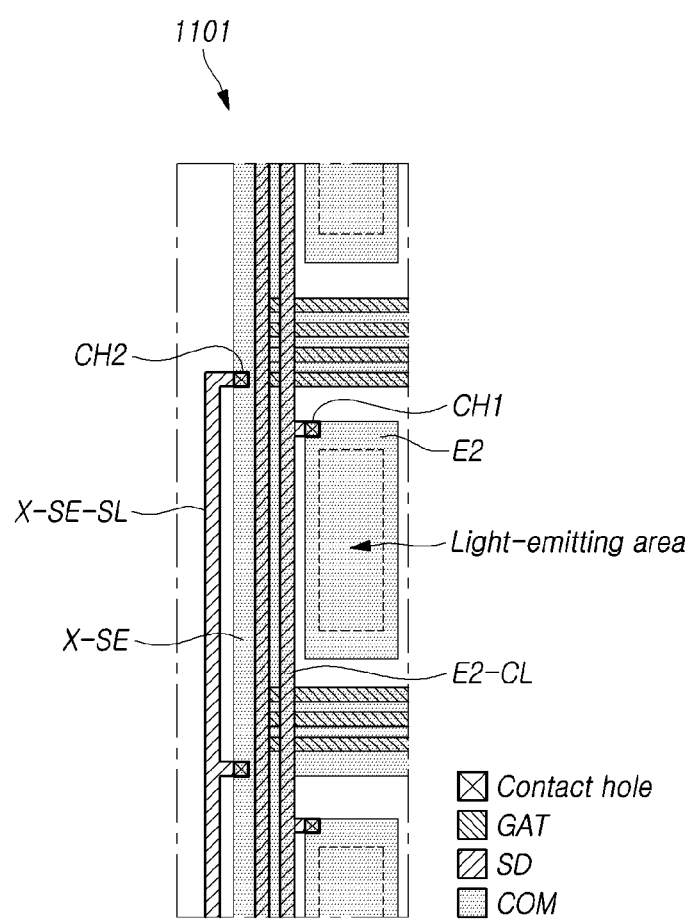
FIG. 12 is an enlarged view of an area indicated by 1101 illustrated in FIG. 11 according to embodiments of the present disclosure.
Figure 13:
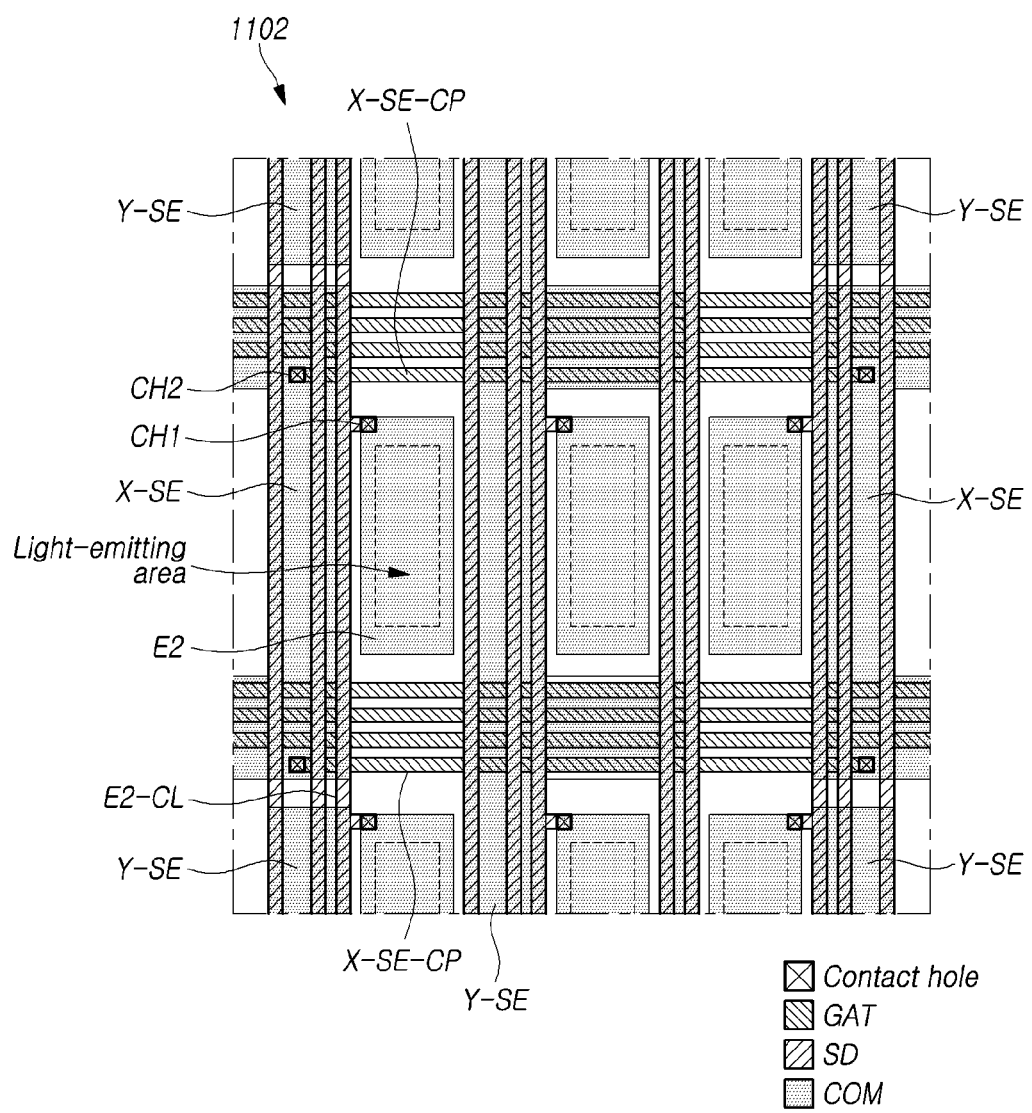
FIG. 13 is an enlarged view of an area indicated by 1102 illustrated in FIG. 11 according to embodiments of the present disclosure.
Figure 14:
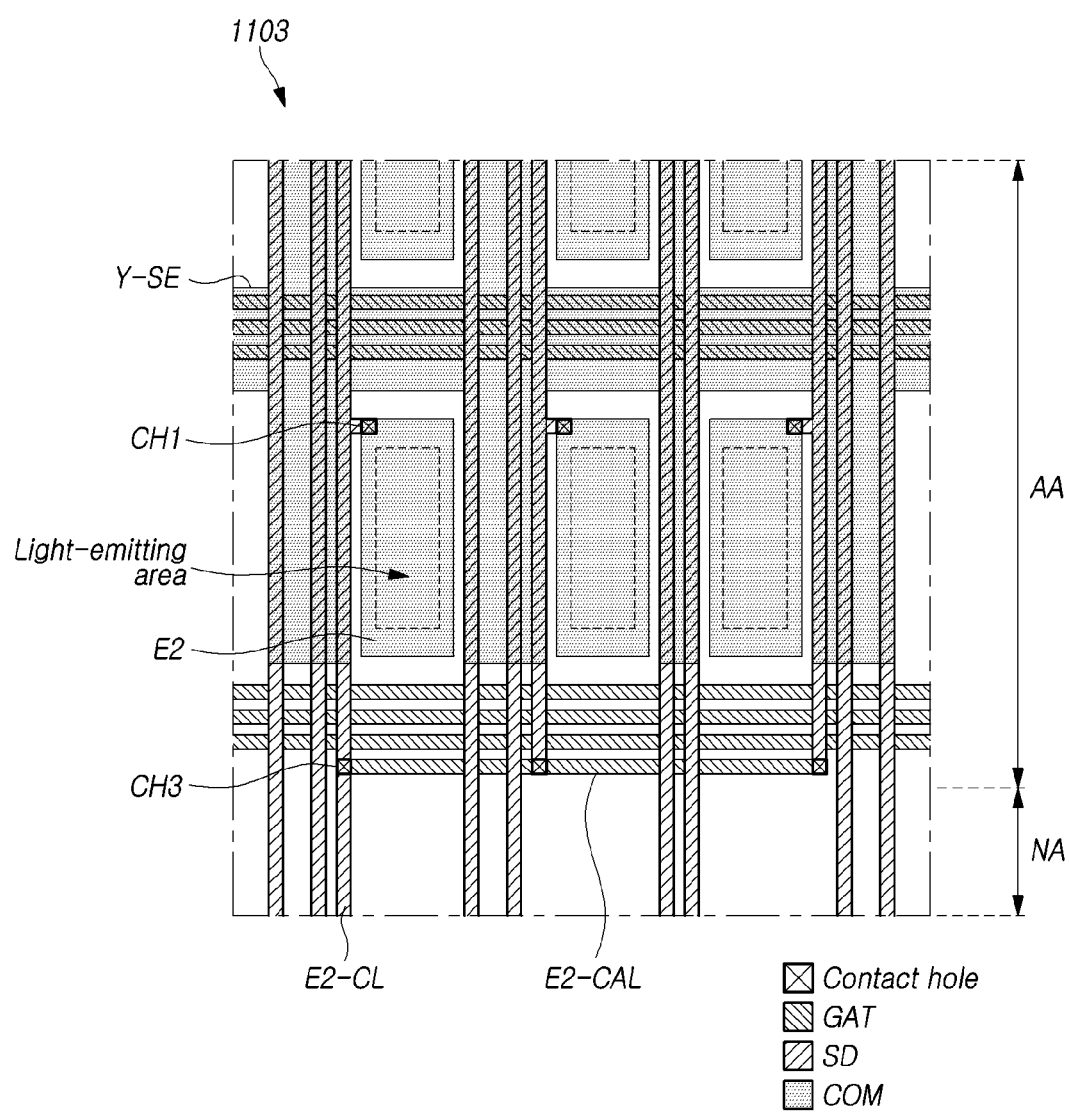
FIG. 14 is an enlarged view of an area indicated by 1103 illustrated in FIG. 11 according to embodiments of the present disclosure.

FIG. 11 is a diagram illustrating an example of a plane structure that the shield electrode SE included in the touch display device is disposed in the display panel DISP entirely according to embodiments of the present disclosure. FIG. 12 is an enlarged view of an area indicated by 1101 illustrated in FIG. 11 according to embodiments of the present disclosure. FIG. 13 is an enlarged view of an area indicated by 1102 illustrated in FIG. 11 according to embodiments of the present disclosure. FIG. 14 is an enlarged view of an area indicated by 1103 illustrated in FIG. 11 according to embodiments of the present disclosure.

Referring to FIGS. 11 and 12, the second electrode E2 can be disposed to be divided to be corresponded to the light-emitting area of the subpixel SP. Each second electrode E2 can be disposed on an area including the light-emitting area of the subpixel SP.

The second electrode E2 can be electrically connected to the second electrode connecting line E2-CL through the first contact hole CH1 positioned outside of the light-emitting area.

The second electrode connecting line E2-CL can be made of the source drain metal SD. The source drain metal SD can be used for forming a line supplying various voltages (e.g., a driving voltage, a reference voltage, an initialization voltage, a data voltage or the like) to the subpixel SP. The source drain metal SD disposed on an area other than an area where the line supplying various voltages is disposed can form the second electrode connecting line E2-CL.

The shield electrode SE can be disposed to be separated from the second electrode E2.

The shield electrode SE can be divided to correspond to the touch electrode TE overlapping the shield electrode SE.

FIG. 12 illustrates an example of an area where an X-shield electrode X-SE positioned on an area overlapping the X-touch electrode X-TE is disposed.

The X-shield electrode X-SE can be disposed to be separated from the second electrode E2. The X-shield electrode X-SE can be disposed on an area including an area overlapping the X-touch electrode X-TE.

The X-shield electrode X-SE can be supplied the shield driving signal SDS through an X-shield routing line X-SE-SL.

The X-shield routing line X-SE-SL, for example, can be made of the source drain metal SD, but not limited to this.

The X-shield electrode X-SE can be electrically connected to the X-shield routing line X-SE-SL through a second contact hole CH2.

The second contact hole CH2 can be a contact hole formed in the bank BANK on which the X-shield electrode X-SE is disposed. Alternatively, in some cases, the second contact hole CH2 can be a contact hole positioned outside of the bank BANK on which the X-shield electrode X-SE is disposed.

The X-shield electrode X-SE can be supplied the shield driving signal SDS corresponding to a signal supplied to the X-touch electrode X-TE through the X-shield routing line X-SE-SL. Furthermore, a Y-shield electrode Y-SE can be supplied the shield driving signal SDS corresponding to a signal supplied to the Y-touch electrode Y-TE through a Y-shield routing line Y-SE-SL.

As the shield electrode SE is supplied the shield driving signal SDS through a shield routing line SE-SL in a structure that the shield electrode SE is connected similarly to corresponding touch electrode TE, thus the shield electrode SE can be easily supplied a signal corresponding to a signal that each touch electrode TE is supplied through the touch routing line TL.

The shield electrode SE can be disposed to be divided according to the touch electrode TE overlapping the shield electrode SE, and can be electrically connected to each other by a connecting pattern positioned under the shield electrode SE.

Referring to FIGS. 11 and 13, they illustrate an example of a structure that the shield electrode SE and the second electrode E2 are disposed on an area where the X-shield electrode X-SE and the Y-shield electrode Y-SE are crossing.

The second electrode E2 can be disposed to be separated for the subpixel SP.

The Y-shield electrode Y-SE of the shield electrode SE can be disposed to be integral by the common electrode metal COM on a layer where the shield electrode SE is disposed.

The X-shield electrode X-SE can be divided on an area where the X-shield electrode X-SE crosses the Y-shield electrode Y-SE. The X-shield electrode X-SE can be connected by a connecting pattern positioned under a layer where the shield electrode SE is disposed. For example, two adjacent X-shield electrode X-SE can be electrically connected to each other by an X-shield electrode connecting pattern X-SE-CP made of the gate metal GAT.

Alternatively, in some cases, the X-shield electrode X-SE can be disposed to be integral by the common electrode metal COM, and the Y-shield electrode Y-SE can be connected by a connecting pattern positioned under a layer where the shield electrode SE is disposed.

The gate metal GAT can be used for forming the gate line GL supplying the scan signal to the subpixel SP. The X-shield electrode connecting pattern X-SE-CP made of the gate metal GAT can be disposed on an area where the gate line GL made of the gate metal GAT is not disposed.

The X-shield electrode X-SE can be electrically connected to the X-shield electrode connecting pattern X-SE-CP through the second contact hole CH2 formed in the bank BANK on which the X-shield electrode X-SE is disposed. In some cases, the X-shield electrode X-SE can be electrically connected to the X-shield electrode connecting pattern X-SE-CP through the second contact hole CH2 positioned outside the bank BANK.

As the X-shield electrode X-SE and the Y-shield electrode Y-SE are disposed to be divided, each of them can be supplied a different signal.

For example, the X-shield electrode X-SE can be supplied the shield driving signal SDS corresponding to a signal supplied to the X-touch electrode X-TE. The Y-shield electrode Y-SE can be supplied the shield driving signal SDS corresponding to a signal supplied to the Y-touch electrode Y-TE.

As the shield driving signal SDS corresponding to a signal supplied to the touch electrode TE overlapping each of the X-shield electrode X-SE and the Y-shield electrode Y-SE is supplied to the X-shield electrode X-SE and the Y-shield electrode Y-SE, thus a parasitic capacitance is not formed between the touch electrode TE and the shield electrode SE in a structure of the touch electrode TE of the mutual-capacitance sensing method.

The second electrode E2 disposed to be divided due to an arrangement of the shield electrode SE can be supplied a voltage through the second electrode connecting line E2-CL.

The second electrode connecting line E2-CL can be formed by using a metal positioned under the second electrode E2, two or more second electrode connecting line E2-CL can be electrically connected to each other outside of the active area AA.

Referring to FIGS. 11 and 14, they illustrate an example of an area where the Y-shield electrode Y-SE is disposed on a boundary of the active area AA and the non-active area NA.

The Y-shield electrode Y-SE can be supplied the shield driving signal SDS through the Y-shield routing line Y-SE-SL.

The second electrode E2 disposed to be divided for each subpixel SP can be supplied the base voltage VSS through the second electrode connecting line E2-CL. The second electrode connecting line E2-CL, for example, can be made of the source drain metal SD. The second electrode E2 positioned on a same column can be electrically connected to a same second electrode connecting line E2-CL.

Two or more second electrode connecting lines E2-CL can be electrically connected to each other by a second electrode connecting auxiliary line E2-CAL outside of the active area AA.

The second electrode connecting auxiliary line E2-CAL can be disposed on a different layer from the second electrode connecting line E2-CL. The second electrode connecting auxiliary line E2-CAL, for example, can be made of the gate metal GAT.

The second electrode connecting line E2-CL can be electrically connected to the second electrode connecting auxiliary line E2-CAL through a third contact hole CH3. The third contact hole CH3, for example, can be a contact hole formed in an insulating film positioned between a layer where the gate metal GAT is disposed and a layer where the source drain metal SD is disposed.

Due to a metal positioned under a layer where the second electrode E2 is disposed, such as the gate metal GAT or the source drain metal SD, the second electrode E2 disposed to be divided can be electrically connected. Furthermore, by a metal positioned under the shield electrode SE, the X-shield electrode X-SE or the Y-shield electrode Y-SE can be electrically connected to each other.

As the shield electrode SE is disposed to be separated from the second electrode E2 and the shield electrode SE is supplied a same signal to corresponding touch electrode TE, a noise according to the display driving can be blocked by the shield electrode SE. A touch detection performance by the touch electrode TE positioned on the encapsulation layer ENCAP can be improved.

Figure 15:
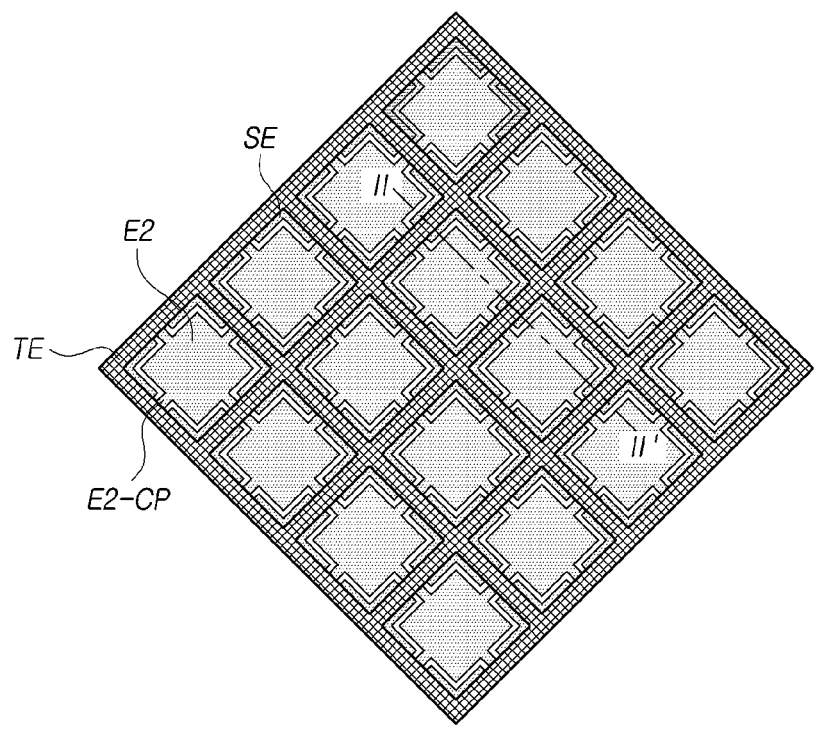
FIG. 15 is a diagram illustrating another example of a plane structure that a touch electrode and a shield electrode included in a touch display device are disposed according to embodiments of the present disclosure.
Figure 16:
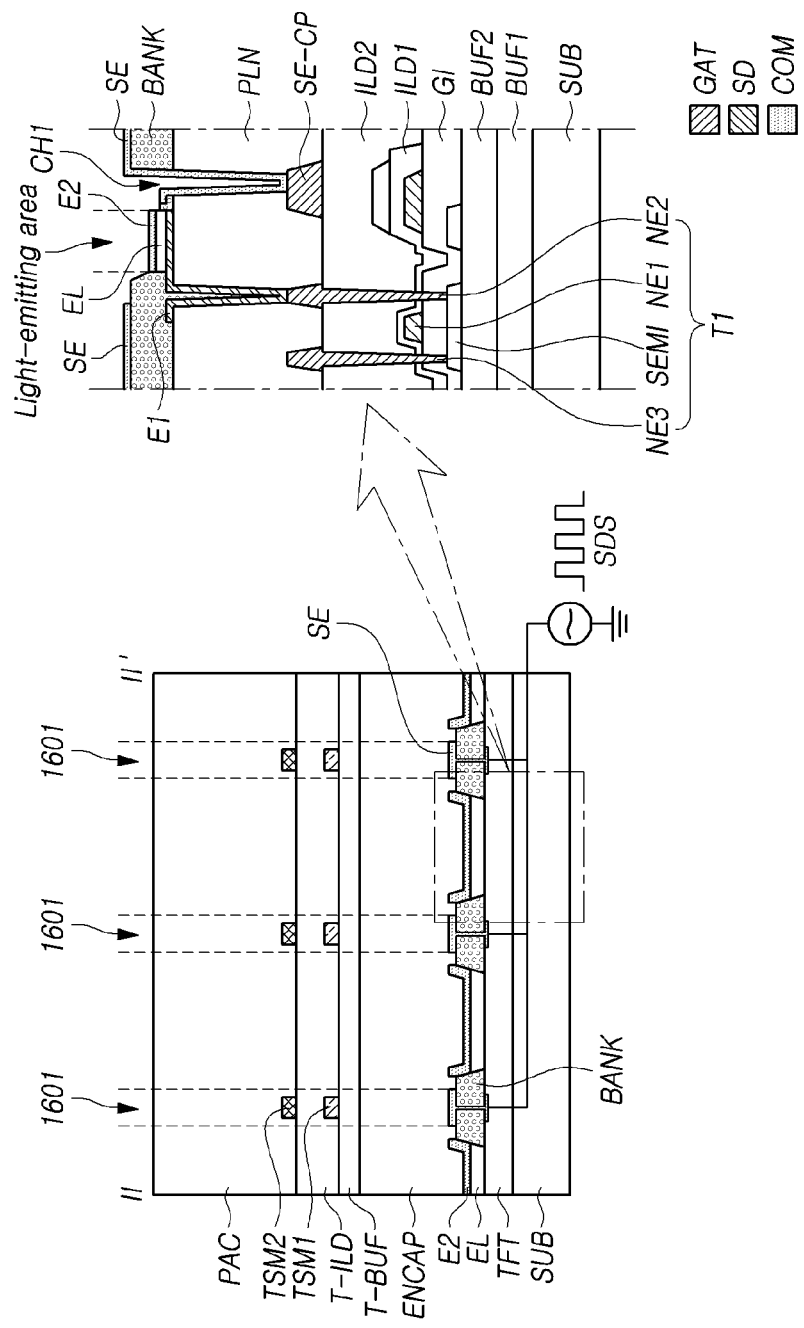
FIG. 16 is a cross-sectional view of II-II' portion illustrated in FIG. 15 according to embodiments of the present disclosure.

FIG. 15 is a diagram illustrating another example of a plane structure that the touch electrode TE and the shield electrode SE included in the touch display device are disposed according to embodiments of the present disclosure. FIG. 16 is a cross-sectional view of II-II' portion illustrated in FIG. 15 according to embodiments of the present disclosure.

Referring to FIG. 15, it illustrates another example of a structure that a part of the second electrode E2 positioned under the encapsulation layer ENCAP is disposed to be divided as the shield electrode SE.

The second electrode E2 can be positioned to be corresponded to the light-emitting area of the subpixel SP. The second electrode E2 can be corresponded to the open area OA of the touch electrode TE.

Among the second electrodes E2, two second electrode E2 positioned adjacently can be electrically connected to each other by the second electrode connecting pattern E2-CP. The second electrode connecting pattern E2-CP can be disposed on a layer where the second electrode E2 is disposed. The second electrode connecting pattern E2-CP can be made of a same material to the second electrode E2.

The shield electrode SE can be disposed on an area other than an area where the second electrode E2 and the second electrode connecting pattern E2-CP are disposed. The shield electrode SE can be disposed on a layer where the second electrode E2 is disposed. The shield electrode SE can be made of a same material to the second electrode E2.

At least a portion of the shield electrode SE can be disposed on an area overlapping the touch electrode TE. At least a portion of the shield electrode SE can be disposed on an area including an area overlapping the touch electrode TE.

The second electrode E2 may not overlap the touch electrode TE. Only a portion of the second electrode connecting pattern E2-CP can overlap the touch electrode TE.

As the second electrode E2 is disposed on an area that is not overlapped by the touch electrode TE, a noise that occurs in a signal detected from the touch electrode TE by the second electrode E2 is reduced.

The shield electrode SE can overlap the touch electrode TE, and can be supplied a signal corresponding to a signal supplied to the touch electrode TE. By the shield electrode SE, a noise that occurs in a signal detected from the touch electrode TE by a signal line positioned under the shield electrode SE is blocked.

The shield electrode SE can be disposed to be divided by the second electrode connecting pattern E2-CP. Adjacent shield electrode SE can be electrically connected by a connecting pattern positioned under the shield electrode SE.

Referring to FIG. 16, the second electrode E2 can be disposed to be divided to be corresponded to the light-emitting area of the subpixel SP.

The shield electrode SE can be disposed to be corresponded to the touch electrode TE on the bank BANK.

Such as a portion indicated by 1601 illustrated in FIG. 16, the first touch sensor metal TSM1 and the second touch sensor metal TSM2 constituting the touch electrode TE or the touch electrode connecting line CL can be positioned in an area overlapping the shield electrode SE.

The shield electrode SE can be electrically connected to the shield electrode connecting pattern SE-CP through the first contact hole CH1 formed in the planarization film PLN positioned under the bank BANK. The shield electrode connecting pattern SE-CP, for example, can be made of the source drain metal SD. The shield electrode SE can be electrically connected to adjacent shield electrode SE by the shield electrode connecting pattern SE-CP.

Alternatively, in some cases, the shield electrode SE can be electrically connected to the shield electrode connecting pattern SE-CP through a contact hole formed in the planarization film PLN and the bank BANK. The shield electrode SE can be electrically connected to the shield electrode connecting pattern SE-CP through a contact hole positioned outside of the light-emitting area of the subpixel SP and formed in the planarization film PLN, or formed in the planarization film PLN and the bank BANK.

The shield electrode SE can be electrically connected to the shield electrode connecting pattern SE-CP, and can be supplied the shield driving signal SDS corresponding to a signal supplied to the touch electrode TE overlapping the shield electrode SE.

The shield electrode SE can have a connection structure corresponding to the touch electrode TE by the shield electrode connecting pattern SE-CP.

Figure 17:
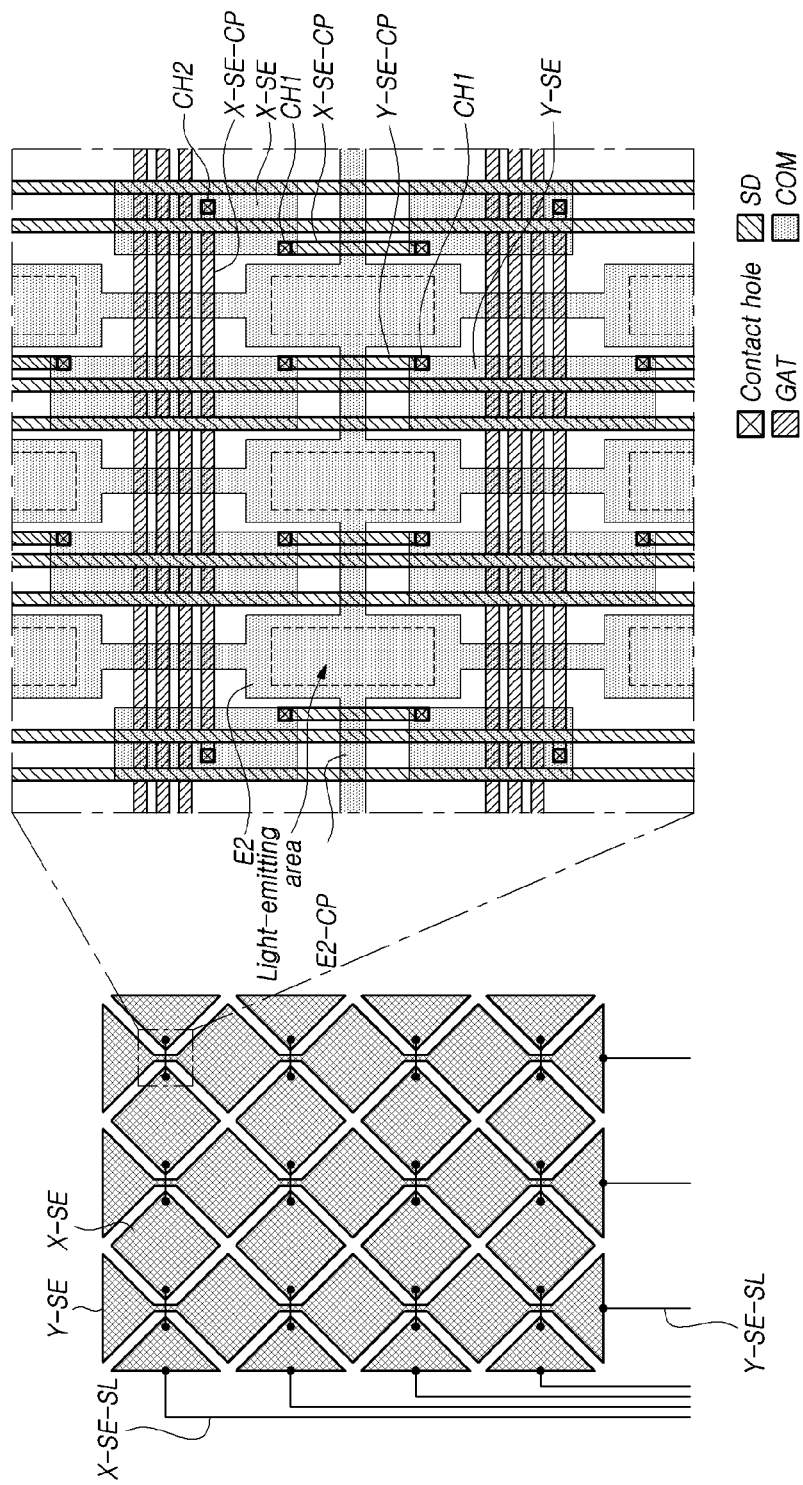
FIGS. 17 and 18 are enlarged views of a part area in another example of a plane structure that a shield electrode included in a touch display device is disposed in a display panel entirely according to embodiments of the present disclosure.
Figure 18:
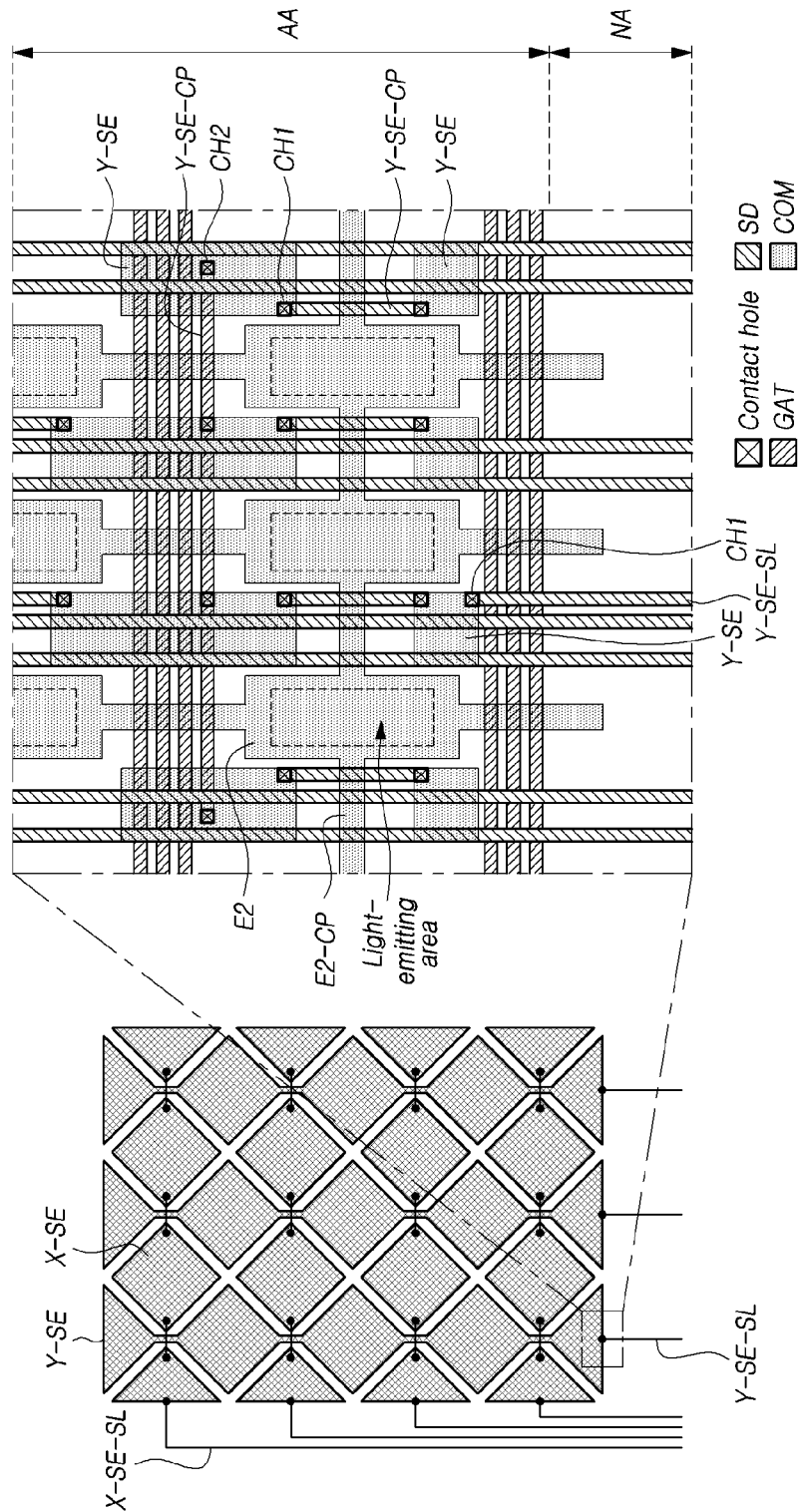

FIGS. 17 and 18 are enlarged views of a part area in another example of a plane structure that the shield electrode SE included in the touch display device is disposed in the display panel DISP entirely according to embodiments of the present disclosure.

FIGS. 17 and 18 illustrate an example of a structure that the second electrode E2 is connected by the second electrode connecting pattern E2-CP made of the common electrode metal COM and the shield electrode SE is connected by the shield electrode connecting pattern SE-CP positioned under the shield electrode SE.

FIG. 17 illustrates an example of a structure that the second electrode E2 and the shield electrode SE are disposed on an area where the X-shield electrode X-SE and the Y-shield electrode Y-SE are crossing.

The second electrode E2 can be disposed to be divided for the light-emitting area of the subpixel SP. The second electrode E2 can be connected by the second electrode connecting pattern E2-CP made of the common electrode metal COM.

The second electrode connecting pattern E2-CP can be disposed in a row direction and a column direction on a layer where the second electrode E2 is disposed. The shield electrode SE can be disposed to be divided by an area where the second electrode connecting pattern E2-CP is disposed.

The shield electrode SE can be disposed on an area overlapping the touch electrode TE.

The X-shield electrode X-SE can be disposed on an area overlapping the X-touch electrode X-TE. Adjacent X-shield electrode X-SE can be electrically connected by the X-shield electrode connecting pattern X-SE-CP positioned under a layer where the shield electrode SE is disposed.

The X-shield electrode connecting pattern X-SE-CP can be made of the gate metal GAT, or can be made of the source drain metal SD.

As the X-shield electrode X-SE is disposed to be divided as several portions due to an arrangement of the second electrode connecting pattern E2-CP, a plurality of X-shield electrode connecting patterns X-SE-CP made of at least one of the gate metal GAT or the source drain metal SD can be disposed for connection of the X-shield electrode X-SE.

The X-shield electrode X-SE can be electrically connected to the X-shield electrode connecting pattern X-SE-CP through the first contact hole CH1 positioned outside of the bank BANK. In some cases, the X-shield electrode X-SE can be electrically connected to the X-shield electrode connecting pattern X-SE-CP through the second contact hole CH2 formed by passing through the bank BANK.

The Y-shield electrode Y-SE can be disposed to be corresponded to the Y-touch electrode Y-TE. Adjacent Y-shield electrode Y-SE can be electrically connected by the Y-shield electrode connecting pattern Y-SE-CP positioned under a layer where the shield electrode SE is disposed.

FIG. 17 illustrates an example that the Y-shield electrode connecting pattern Y-SE-CP is made of the source drain metal SD, but in some cases, at least a portion of the Y-shield electrode connecting pattern Y-SE-CP can be made of a different metal such as the gate metal GAT.

The X-shield electrode X-SE can be disposed to be connected to be corresponded to a connection structure of the X-touch electrode X-TE.

Each of the X-shield electrode X-SE and the Y-shield electrode Y-SE can be supplied the shield driving signal SDS corresponding to a signal supplied to the X-touch electrode X-TE and the Y-touch electrode Y-TE. By preventing or at least reducing formation of a parasitic capacitance between the shield electrode SE and the touch electrode TE, a noise blocking function by the shield electrode SE can be implemented.

FIG. 18 illustrates an example of an arrangement structure of the second electrode E2 and the shield electrode SE on a boundary area of the active area AA and the non-active area NA.

The second electrode E2, similarly to an example illustrated in FIG. 17, can be disposed to be divided for the light-emitting area of the subpixel SP. The second electrode E2 can be connected by the second electrode connecting pattern E2-CP made of the common electrode metal COM. The second electrode connecting pattern E2-CP can be extended to outside of the active area AA, and can be electrically connected to a line supplying the base voltage VSS.

The shield electrode SE can be disposed to be divided as the X-shield electrode X-SE and the Y-shield electrode Y-SE depending on corresponding touch electrode TE. FIG. 18 illustrates an example of an area where the Y-shield electrode Y-SE is disposed.

The Y-shield electrode Y-SE can be connected by the Y-shield electrode connecting pattern Y-SE-CP made of the gate metal GAT and the Y-shield electrode connecting pattern Y-SE-CP made of the source drain metal SD.

The Y-shield electrode Y-SE can be electrically connected to the Y-shield routing line Y-SE-SL made of the source drain metal SD on a boundary area of the active area AA and the non-active area NA. The Y-shield electrode Y-SE can be supplied the shield driving signal SDS through the Y-shield routing line Y-SE-SL.

The shield driving signal SDS supplied to the Y-shield electrode Y-SE can be a signal corresponding to a signal supplied to the Y-touch electrode Y-TE.

Such as described above, since the shield electrode SE is disposed to be corresponded to the touch electrode TE and is supplied a signal corresponding to a signal supplied to the touch electrode TE, a noise blocking function by the shield electrode SE can be implemented.

Furthermore, embodiments of the present disclosure can provide methods preventing that the shield driving signal SDS affects the display driving while implementing a noise blocking function by the shield electrode SE.

Figure 19:
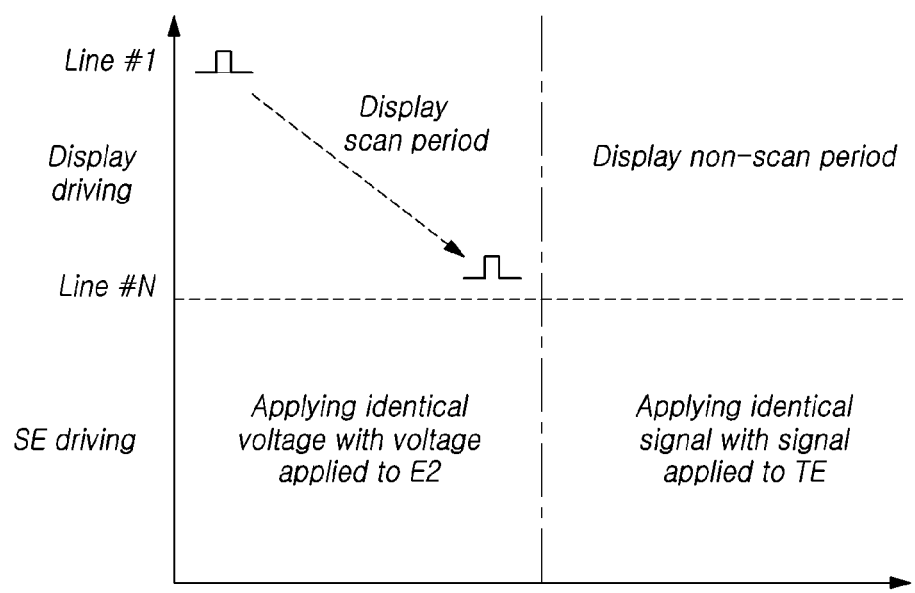
FIG. 19 is a diagram illustrating an example of a driving method of a shield electrode in a touch display device according to embodiments of the present disclosure.

FIG. 19 is a diagram illustrating an example of a driving method of the shield electrode SE in the touch display device according to embodiments of the present disclosure.

Referring to FIG. 19, it illustrates an example of the shield driving signal SDS supplied to the shield electrode SE according to a display driving period.

The display driving period, for example, can be divided as a display scan period that the scan signal is supplied to the gate line GL and a display non-scan period that the scan signal is not supplied to the gate line GL.

An identical voltage to a voltage applied to the second electrode E2 can be supplied to the shield electrode SE in the display scan period. Alternatively, a constant voltage different from a voltage applied to the second electrode E2 can be supplied to the shield electrode SE in the display scan period. Alternatively, a certain voltage may not be supplied to the shield electrode SE in the display scan period, thus the shield electrode SE can be floated.

The shield driving signal SDS identical to a signal applied to the touch electrode TE can be supplied to the shield electrode SE in the display non-scan period.

As a voltage applied to the second electrode E2 or a constant voltage is supplied to the shield electrode SE in the display non-scan period, it can be prevented that a voltage or a signal supplied to the data line DL or the like overlapping the shield electrode SE is fluctuated by a signal supplied to the shield electrode SE.

As the shield driving signal SDS identical to a signal applied to the touch electrode TE is supplied to the shield electrode SE in the display non-scan period, a parasitic capacitance may not formed between the shield electrode SE and the touch electrode TE. A noise blocking function by the shield electrode SE can be implemented while preventing that the shield driving signal SDS affects the display driving.

Alternatively, by adjusting a frequency of the shield driving signal SDS, the shield driving signal SDS can be supplied to the shield electrode SE in an overall period of the display driving period, and a noise blocking function can be implemented.

Figure 20:
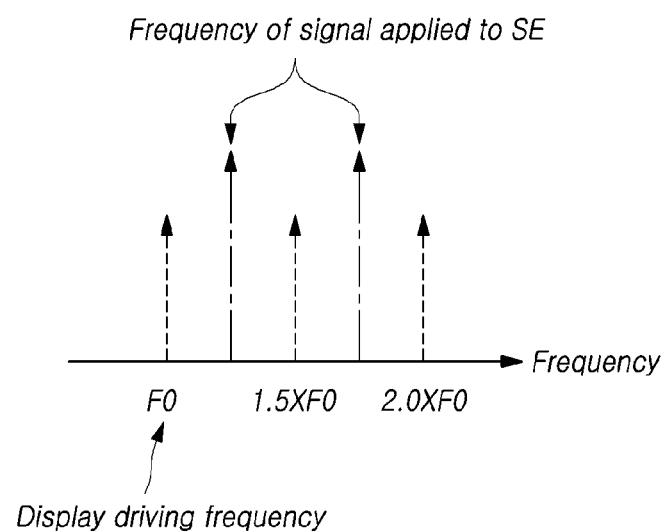
FIG. 20 is a diagram illustrating another example of a driving method of a shield electrode in a touch display device according to embodiments of the present disclosure.

FIG. 20 is a diagram illustrating another example of a driving method of the shield electrode SE in the touch display device according to embodiments of the present disclosure.

Referring to FIG. 20, a frequency of the shield driving signal SDS supplied to the shield electrode SE can be different from a display driving frequency.

The display driving frequency can be a frequency of any one of signals for the display driving, for example, can mean a frequency of a vertical synchronization signal or a horizontal synchronization signal for the display driving.

The frequency of the shield driving signal SDS can be different from the display driving frequency. Furthermore, the frequency of the shield driving signal SDS can be different from a certain multiple (e.g., 1.5 times, 2 times, or the like) of the display driving signal.

As the frequency of the shield driving signal SDS is different from the display driving frequency, even if the shield driving signal SDS is supplied to the shield electrode SE in the display driving period, it can be prevented that the shield driving signal SDS occurs an interference to the signal for the display driving.

The shield driving signal SDS can be supplied to the shield electrode SE in an overall period of the display driving period while preventing an interference between the shield driving signal SDS and a signal for the display driving.

A noise blocking function by the shield electrode SE and the shield driving signal SDS can be implemented while preventing to affect the display driving.

The embodiments of the present disclosure described above will be briefly described as follows.

A touch display device according to embodiments of the present disclosure can include a substrate SUB including an active area AA where a plurality of subpixels SP are disposed and a non-active area NA positioned outside of the active area AA, an encapsulation layer ENCAP disposed on at least a part area of the active area AA and the non-active area NA, a plurality of touch electrodes TE positioned on the encapsulation layer ENCAP, a plurality of common electrodes positioned under the encapsulation layer ENCAP and disposed on an area including a light-emitting area included in each of the plurality of subpixels SP, and a plurality of shield electrodes SE disposed to be separated from the plurality of common electrodes under the encapsulation layer ENCAP and disposed on at least a part area of an area overlapping the plurality of touch electrodes TE.

The common electrode can mean a second electrode E2 of a light-emitting element ED disposed on the subpixel SP.

The plurality of shield electrodes SE can be made of a same material to the plurality of common electrodes.

At least a part of the plurality of shield electrodes SE can be disposed on a layer where the plurality of common electrodes are disposed.

The touch display device can further include a contact hole positioned outside of a boundary of the light-emitting area and in which a portion of one of the plurality of common electrodes or a portion of one of the plurality of shield electrodes SE is disposed.

The touch display device can include a bank BANK disposed under the plurality of shield electrodes SE and having a side portion separated from at least a part of a boundary of the light-emitting area.

At least two common electrodes of the plurality of common electrodes can be electrically connected to each other by a common electrode connecting pattern disposed on a layer where the plurality of common electrodes are disposed.

At least two common electrodes of the plurality of common electrodes can be electrically connected to each other by a common electrode connecting pattern positioned between the substrate SUB and a layer where the plurality of common electrodes are disposed.

At least two shield electrodes SE of the plurality of shield electrodes SE can be disposed to be integral on a layer where the plurality of common electrodes are disposed.

At least two shield electrodes SE of the plurality of shield electrodes SE can be electrically connected to each other by a shield electrode connecting pattern SE-CP positioned between the substrate SUB and a layer where the plurality of common electrodes are disposed.

At least one of the plurality of shield electrodes SE can be supplied a shield driving signal SDS different from a common voltage in at least a part period of a period that the common voltage is supplied to the plurality of common electrodes.

The shield driving signal SDS can be a signal corresponding to a touch driving signal supplied to the plurality of touch electrodes TE.

Among the plurality of touch electrodes TE, a first touch driving signal can be supplied to a first touch electrode and a second touch driving signal different from the first touch driving signal can be supplied to a second touch electrode. Among the plurality of shield electrodes SE, a first shield driving signal corresponding to the first touch driving signal can be supplied to a first shield electrode overlapping the first touch electrode and a second shield driving signal corresponding to the second touch driving signal and different from the first shield driving signal can be supplied to a second shield electrode overlapping the second touch electrode.

The plurality of shield electrodes SE can be supplied the shield driving signal SDS through at least one shield routing line SE-SL disposed on the non-active area NA.

At least one of the plurality of shield electrodes SE can be supplied the common voltage in at least a part period of a period that a scan signal is supplied to the plurality of subpixels SP in a period that the common voltage is supplied to the plurality of common electrodes.

A frequency of the shield driving signal SDS can be different from a frequency of at least one of signals for driving the plurality of subpixels SP.

A touch display device according to embodiments of the present disclosure can include a plurality of touch electrodes TE including a plurality of open areas OA, a plurality of first common electrodes disposed on an area corresponding to the plurality of open areas OA and being supplied a common voltage in a display driving period, and a plurality of second common electrodes disposed to be separated from the plurality of first common electrodes, disposed on at least a part area of an area overlapping the plurality of touch electrodes TE, and being supplied a signal different from the common voltage in at least a part period of the display driving period.

According to embodiments of the present disclosure above-mentioned, as the shield electrode SE separated from the second electrode E2 is disposed on an area overlapping the touch electrode TE under the encapsulation layer ENCAP, a parasitic capacitance between the second electrode E2 and the touch electrode TE can be reduced. A direct parasitic capacitance between a signal line positioned under the shield electrode SE and the touch electrode TE can be prevented by the shield electrode SE.

Furthermore, the shield driving signal SDS corresponding to a signal supplied to the touch electrode TE can be supplied to the shield electrode SE. A parasitic capacitance between the shield electrode SE and the touch electrode TE may not be formed, a noise blocking function by the shield electrode SE can be implemented.

Furthermore, a period that the shield driving signal SDS is supplied to the shield electrode SE can be limited in a display non-scan period of a display driving period, or a frequency of the shield driving signal SDS can be configured to be different from a display driving frequency. A touch detection function can be improved by the noise blocking function by the shield electrode SE while preventing that a driving of the shield electrode SE affects a display driving.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device, comprising:
    a substrate including an active area where a plurality of subpixels are disposed and a non-active area positioned outside of the active area;
    an encapsulation layer disposed on at least a part area of the active area and the non-active area;
    a plurality of touch electrodes positioned on the encapsulation layer;
    a plurality of common electrodes positioned under the encapsulation layer and disposed on an area including a light-emitting area included in each of the plurality of subpixels; and
    a bank disposed under the encapsulation layer, and having a side portion separated from at least a part of a boundary of the light-emitting area;
    a plurality of shield electrodes disposed on a same layer as the plurality of common electrodes under the encapsulation layer and separated from the plurality of common electrodes, the plurality of shield electrodes disposed on at least a part of an area overlapping the plurality of touch electrodes,
    wherein the plurality of shield electrodes are disposed on the bank, and the plurality of shield electrodes are made of a same material as the plurality of common electrodes.

2. The touch display device of claim 1, further comprising:
    a contact hole positioned outside of a boundary of the light-emitting area and in which a portion of one of the plurality of common electrodes or a portion of one of the plurality of shield electrodes is disposed.

3. The touch display device of claim 1, wherein at least two common electrodes of the plurality of common electrodes are electrically connected to each other by a common electrode connecting pattern disposed on a same layer as the plurality of common electrodes.

4. The touch display device of claim 1, wherein at least two common electrodes of the plurality of common electrodes are electrically connected to each other by a common electrode connecting pattern positioned between the substrate and a layer where the plurality of common electrodes are disposed.

5. The touch display device of claim 1, wherein at least two shield electrodes of the plurality of shield electrodes are integral on a layer where the plurality of common electrodes are disposed.

6. The touch display device of claim 1, wherein at least two shield electrodes of the plurality of shield electrodes are electrically connected to each other by a shield electrode connecting pattern positioned between the substrate and a layer where the plurality of common electrodes are disposed.

7. The touch display device of claim 1, wherein at least one of the plurality of shield electrodes is supplied a shield driving signal that is different from a common voltage in at least a portion of a period that the common voltage is supplied to the plurality of common electrodes.

8. The touch display device of claim 7, wherein the shield driving signal is a signal corresponding to a touch driving signal supplied to the plurality of touch electrodes.

9. The touch display device of claim 8, wherein, among the plurality of touch electrodes, a first touch driving signal is supplied to a first touch electrode and a second touch driving signal that is different from the first touch driving signal is supplied to a second touch electrode,
    among the plurality of shield electrodes, a first shield driving signal corresponding to the first touch driving signal is supplied to a first shield electrode overlapping the first touch electrode, and a second shield driving signal corresponding to the second touch driving signal and different from the first shield driving signal is supplied to a second shield electrode overlapping the second touch electrode.

10. The touch display device of claim 7, wherein the plurality of shield electrodes are supplied the shield driving signal through at least one shield routing line disposed on the non-active area.

11. The touch display device of claim 7, wherein at least one of the plurality of shield electrodes is supplied the common voltage in at least a portion of a period that a scan signal is supplied to the plurality of subpixels in a period that the common voltage is supplied to the plurality of common electrodes.

12. The touch display device of claim 7, wherein a frequency of the shield driving signal is different from a frequency of at least one signal for driving the plurality of subpixels.

13. A touch display device, comprising:
    a plurality of touch electrodes including a plurality of open areas;
    a plurality of first common electrodes disposed on an area corresponding to the plurality of open areas, the plurality of first common electrodes supplied a common voltage in a display driving period; and
    a plurality of second common electrodes that are separated from the plurality of first common electrodes disposed on at least a portion of an area overlapping the plurality of touch electrodes and the plurality of second common electrodes supplied a signal identical to a signal applied to the plurality of touch electrodes in a period other than a period that a scan signal is supplied in the display driving period, and the plurality of second common electrodes supplied a voltage identical to the common voltage or a constant voltage in a period that a scan signal is supplied the display driving period,
    wherein the plurality of second common electrodes are disposed on a same layer as the plurality of first common electrodes.

14. The touch display device of claim 13, wherein a frequency of the signal that the plurality of second common electrodes are supplied is different from a frequency of at least one of signals for a display driving.

* * * * *